US012586919B2

(12) United States Patent
Ko et al.

(10) Patent No.: US 12,586,919 B2
(45) Date of Patent: Mar. 24, 2026

(54) ELECTRONIC DEVICE AND METHOD FOR TRANSMITTING BEAMFORMING SIGNAL BY USING LIQUID CRYSTAL LAYER

(71) Applicants: SAMSUNG ELECTRONICS CO., LTD., Suwon-si (KR); POSTECH Research and Business Development Foundation, Pohang-si (KR)

(72) Inventors: Seungtae Ko, Suwon-si (KR); Daehyeon Kim, Pohang-si (KR); Jungyub Lee, Suwon-si (KR); Wonbin Hong, Pohang-si (KR)

(73) Assignees: SAMSUNG ELECTRONICS CO., LTD., Suwon-si (KR); POSTECH Research and Business Development Foundation, Pohang-si (KR)

( * ) Notice: Subject to any disclaimer, the term of this patent is extended or adjusted under 35 U.S.C. 154(b) by 301 days.

(21) Appl. No.: 18/205,932

(22) Filed: Jun. 5, 2023

(65) Prior Publication Data

US 2024/0055770 A1 Feb. 15, 2024

Related U.S. Application Data

(63) Continuation of application No. PCT/KR2023/006519, filed on May 12, 2023.

(30) Foreign Application Priority Data

Aug. 13, 2022 (KR) ........................ 10-2022-0101687
Sep. 2, 2022 (KR) ........................ 10-2022-0111742

(51) Int. Cl.
*H01Q 15/00* (2006.01)
*H01Q 9/16* (2006.01)

(52) U.S. Cl.
CPC ............. *H01Q 15/002* (2013.01); *H01Q 9/16* (2013.01)

(58) Field of Classification Search
CPC ........ G01N 27/12; G01N 33/00; G01R 23/02; C07D 471/06; H01Q 25/00; H01Q 5/45; H01Q 13/02; H01Q 15/002; H01Q 9/16
See application file for complete search history.

(56) References Cited

U.S. PATENT DOCUMENTS 7,190,325 B2 3/2007 Nagy
10,320,084 B2 6/2019 Bily et al.
(Continued)

FOREIGN PATENT DOCUMENTS

CN 111146598 A 5/2020
CN 108767485 B 11/2020
(Continued)

OTHER PUBLICATIONS

Lee, et al., "Cell Coverage Analysis of 28 GHz Millimeter Wave in Urban Microcell Environment Using 3-D Ray Tracing", 2018, IEEE Transactions on Antennas and Propagation, vol. 66, No. 3, 9 pages total.

(Continued)

*Primary Examiner* — Michael A Faragalla
(74) *Attorney, Agent, or Firm* — Sughrue Mion, PLLC

(57) ABSTRACT

An electronic device includes a memory, a frequency selective surface (FSS) including a plurality of cells, and at least one processor. Each cell of the plurality of cells includes a liquid crystal layer. The at least one processor is configured to receive a signal from another electronic device based on the FSS. The at least one processor is configured to determine refraction information for each cell of the plurality of cells of the FSS based on a difference between first pattern information for the other electronic device and second (Continued)

pattern information for the received signal. The at least one processor is configured to perform a reconfiguration for the FSS based on refraction information for each cell of the plurality of cells of the FSS. The at least one processor is configured to obtain a reconstruction signal from the other electronic device based on the reconfigured FSS.

18 Claims, 16 Drawing Sheets

(56) References Cited

U.S. PATENT DOCUMENTS

| | | | | |
|---|---|---|---|---|
| 10,720,712 | B2 | 7/2020 | Foo | |
| 11,143,931 | B2 | 10/2021 | Gooth et al. | |
| 11,181,782 | B2 | 11/2021 | Miyake | |
| 11,688,929 | B2 | 6/2023 | Charvat et al. | |
| 2018/0083364 | A1 | 3/2018 | Foo | |
| 2020/0018713 | A1* | 1/2020 | Bunes | G01N 27/127 |
| 2020/0161777 | A1* | 5/2020 | Boutayeb | H01Q 25/00 |
| 2021/0210860 | A1 | 7/2021 | Ahadi et al. | |
| 2021/0242570 | A1* | 8/2021 | Charvat | G01S 13/878 |
| 2022/0004040 | A1 | 1/2022 | Mondiot | |
| 2022/0320715 | A1 | 10/2022 | Hong et al. | |
| 2025/0070456 | A1 | 2/2025 | Hong et al. | |

FOREIGN PATENT DOCUMENTS

| | | | |
|---|---|---|---|
| CN | 113097750 | A | 7/2021 |
| KR | 10-2018-0096695 | A | 8/2018 |
| KR | 10-2021-0004805 | A | 1/2021 |
| KR | 10-2021-0081123 | A | 7/2021 |
| WO | 2021/007083 | A1 | 1/2021 |
| WO | 2022/039493 | A1 | 2/2022 |

OTHER PUBLICATIONS

Niknam, et al., "Interference Analysis for Finite-Area 5G mmWave Networks Considering Blockage Effect", 2018, IEEE Access, vol. 6, 10 pages total.

Syrytsin, et al., "User-Shadowing Suppression for 5G mm-Wave Mobile Terminal Antennas", 2019, IEEE Transactions on Antennas and Propagation, vol. 67, No. 6, 11 pages total.

Heino, et al., "Reflector Design to Mitigate Finger Effect on 60 GHz User Devices", 2017, 11th European Conference on Antennas and Propagation (EUCAP), 5 pages total.

"Cloaking and Invisibility", 2018, The Advanced Science Research Center at The Graduate Center, CUNY, 5 pages total, https://metamaterials.ws.gc.cuny.edu/research/cloaking-and-invisibility/.

Tay, et al., "A non-singular transformation optics invisibility cloak by combining with scattering cancellation", 2019, Physica Scripta, vol. 94, Issue 045503, 6 pages total.

Schurig, et al., "Metamaterial Electromagnetic Cloak at Microwave Frequencies", 2006, Science Magazine, vol. 314, 5 pages total.

Liu, et al., "Nonideal ultrathin mantle cloak for electrically large conducting cylinders", 2014, J. Opt. Soc. Am. A., vol. 31, No. 9, 8 pages total.

International Search Report (PCT/ISA/210) dated Aug. 23, 2023, issued by the International Searching Authority in International Application No. PCT/KR2023/006519.

Written Opinion (PCT/ISA/237) dated Aug. 23, 2023, issued by the International Searching Authority in International Application No. PCT/KR2023/006519.

Communication dated Oct. 22, 2025, issued by the European Patent Office in European Application No. 23854974.5.

Perez-Palomino et al., "Design and Demonstration of an Electronically Scanned Reflectarray Antenna at 100GHz Using Multiresonant Cells Based on Liquid Crystals", IEEE Transactions On Antennas and Propagation, May 18, 2015, vol. 63, No. 8, pp. 3722-3727 (6 pages total).

* cited by examiner

400

520

530

ELECTRONIC DEVICE AND METHOD FOR TRANSMITTING BEAMFORMING SIGNAL BY USING LIQUID CRYSTAL LAYER

CROSS-REFERENCE TO RELATED APPLICATIONS

This application is a bypass continuation application of International Patent Application No. PCT/KR2023/006519, filed on May 12, 2023, which is based on and claims priority to Korean Patent Application No. 10-2022-0101687, filed on Aug. 13, 2022 with the Korean Intellectual Property Office, and also to Korean Patent Application No. 10-2022-0111742, filed on Sep. 2, 2022 with the Korean Intellectual Property Office, the disclosures of each of which are incorporated by reference herein in their entireties.

BACKGROUND

1. Field

The disclosure relates to an electronic device and a method for transmitting a beamforming signal by using a liquid crystal layer.

2. Description of Related Art 5G communication technology uses a high frequency band. In order to overcome short wavelength and large path loss in the high frequency band, a frequency selective surface (FSS) may be used. An FSS has a structure in which conductive patterns or shapes are periodically arranged on a dielectric substrate, and has a filter characteristic that selectively passes or reflects a specific frequency band of incident plane waves.

An FSS uses high gain characteristics to overcome the aforementioned loss.

SUMMARY

In accordance with aspects of the disclosure, an electronic device may comprise a memory, a frequency selective surface (FSS) comprising a plurality of cells, and at least one processor. Each cell of the plurality of cells may comprise a liquid crystal layer. The at least one processor may be configured to receive a signal from another electronic device based on the FSS. The at least one processor may be configured to determine refraction information for each cell of the plurality of cells of the FSS based on a difference between first pattern information for the other electronic device and second pattern information for the received signal. The at least one processor may be configured to perform a reconfiguration for the FSS based on refraction information for each cell of the plurality of cells of the FSS. The at least one processor may be configured to obtain a reconstruction signal from the other electronic device based on the reconfigured FSS.

In accordance with aspects of the disclosure, a method performed by an electronic device may comprise receiving a signal from another electronic device based on a frequency selective surface (FSS) comprising a plurality of cells. Each cell of the plurality of cells may comprise a liquid crystal layer. The method may comprise determining refraction information for each cell of the plurality of cells of the FSS based on a difference between first pattern information for the other electronic device and second pattern information for the received signal. The method may comprise performing a reconfiguration for the FSS based on refraction information for each cell of the plurality of cells of the FSS. The method may comprise obtaining a reconstruction signal from the other electronic device based on the reconfigured FSS.

BRIEF DESCRIPTION OF THE DRAWINGS

The above and other aspects and features of certain embodiments of the present disclosure will be more apparent from the following description taken in conjunction with the accompanying drawings, in which.

DETAILED DESCRIPTION

Figure 1:
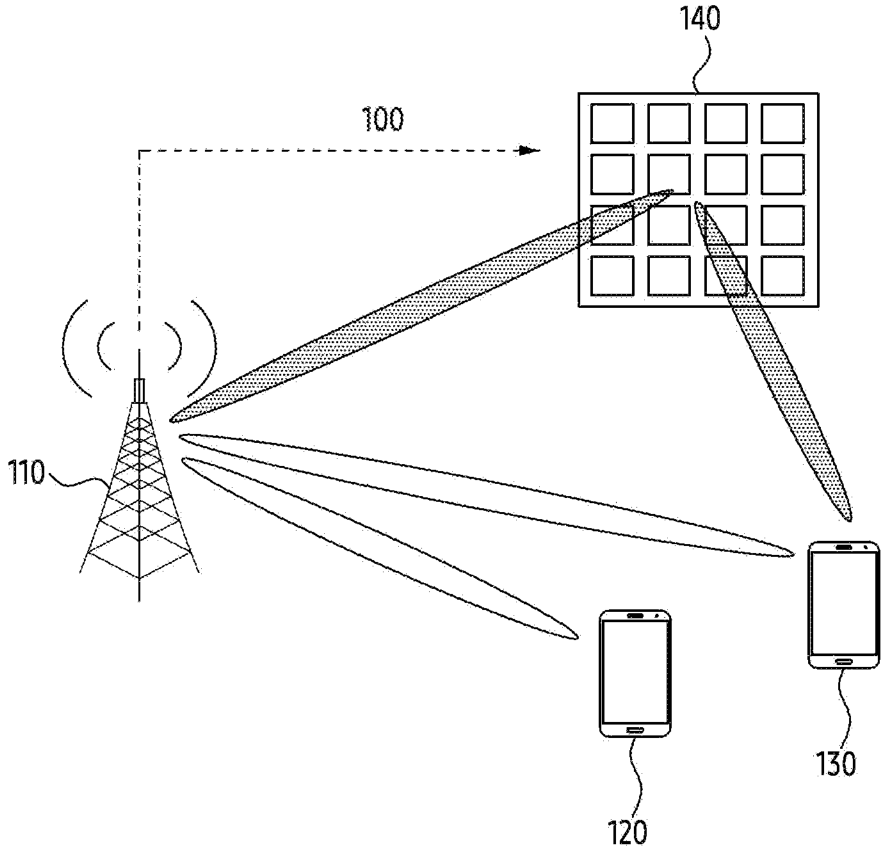
FIG. 1 illustrates an example of a wireless communication environment according to various embodiments.

Terms used in the present disclosure are used only to describe a specific embodiment, and are not necessarily intended to limit the scope of other embodiments. A singular expression may include a plural expression unless it is clearly meant differently in the context. The terms used herein, including technical or scientific terms, may have the same meaning as generally understood by a person having ordinary knowledge in the technical field described in the present disclosure. Terms defined in a general dictionary among the terms used in the present disclosure may be interpreted with the same or similar meaning as a contextual meaning of related technology, and unless clearly defined in the present disclosure, should not interpreted in an ideal or excessively formal meaning. In some cases, even terms defined in the present disclosure should not be interpreted to exclude embodiments of the present disclosure.

Regarding the description of the drawings, the same or similar reference numerals may be used for the same or similar components.

In various embodiments of the present disclosure described below, a hardware approach is described as an example. However, since the various embodiments of the present disclosure include technology that use both hardware and software, the various embodiments of the present disclosure do not exclude a software-based approach.

Terms referring to a signal (e.g., signal, information, message, signaling), terms for a calculation state (e.g., step, operation, procedure), terms referring to data (e.g., packet, user stream, information, bit), terms referring to a channel, terms referring to a network entity, terms referring to a component of a device, and the like used in the following description are exemplified for convenience of explanation. Accordingly, the present disclosure is not limited to terms described below, and other terms having an equivalent technical meaning may be substituted.

A term referring to a part of electronic device (e.g., substrate, print circuit board (PCB), flexible PCB (FPCB), module, layer, antenna, antenna element, circuit, processor, chip, component, device), a term referring to a shape of a part (e.g., structure, construction, supporting part, contacting part, protruding part), a term referring to a connecting part between structures (e.g., connecting part, contacting part, supporting part, contact structure, conductive member, assembly), a term referring to a circuit (e.g., PCB, FPCB, signal line, feeding line, data line, RF signal line, antenna line, RF path, RF module, RF circuit, splitter, divider, coupler, combiner), and the like used in the following description are illustrated for convenience of description. Accordingly, the present disclosure is not limited to terms described below, and another term having an equivalent technical meaning may be substituted. A term such as ' . . . unit', ' . . . er', ' . . . material', ' . . . body', and the like used below may mean at least one shape structure, or may mean a unit that processes a function.

In the present disclosure, in order to determine whether a specific condition is satisfied or fulfilled, an expression of 'more than' or 'less than' may be used, but this is only a description for expressing an example, and does not exclude description of 'more than or equal to' or 'less than or equal to'. A condition described as 'more than or equal to' may be replaced with 'more than', a condition described as 'less than or equal to' may be replaced with 'less than', and a condition described as 'more than or equal to and less than' may be replaced with 'more than and less than or equal to'.

Hereinafter, 'A' to '13' means at least one of elements from A (including A) and to B (including B).

The present disclosure describes various embodiments by using terms used in some communication standards (e.g., 3rd Generation Partnership Project (3GPP), European Telecommunications Standards Institute (ETSI), extensible radio access network (xRAN), and open-radio access network (O-RAN), but this is only an example for description. Various embodiments of the present disclosure may be easily modified and applied to other communication systems as well.

FIG. 1 illustrates an example of a wireless communication environment according to various embodiments.

Referring to FIG. 1, the wireless communication environment 100 of FIG. 1 includes a base station 110, a terminal 120, and a terminal 130 as parts of nodes using a wireless channel.

The base station 110 is a network infrastructure that provides wireless access to the terminal 120 and/or the terminal 130. The base station 110 has coverage defined as a constant geographic area based on a distance capable of transmitting a signal. The base station 110 may also be referred to as a 'massive multiple input multiple output (MIMO) unit (MMU)', 'access point (AP)', 'eNodeB (eNB) ', '5th generation node (5G node)', '5G NodeB (NB)', 'wireless point', 'transmission/reception point (TRP)', 'access unit', 'distributed unit (DU)', 'radio unit (RU)', 'remote radio head (RRH)', or another term having an equivalent technical meaning. The base station 110 may transmit a downlink signal or may receive an uplink signal.

Each of the terminals 120 and 130 is a device used by a user, and may perform communication with the base station 110 through the wireless channel. Hereinafter, for convenience of description, the terminal 120 is described, but the description of the terminal 120 may be applied to the terminal 130. In some cases, the terminal 120 may be operated without user involvement. In other words, the terminal 120 may be any device that performs machine type communication (MTC), and need not be carried or operated by a user. The terminal 120 may also be referred to as a user equipment (UE), a mobile station, a subscriber station, a customer premises equipment (CPE), a remote terminal, a wireless terminal, an electronic device, a terminal for vehicle, a user device, or another term having an equivalent technical meaning.

The terminal 120 and a terminal 130 illustrated in FIG. 1 may support vehicle communication. In the context of vehicle communication, in an LTE system, standardization work for V2X technology based on a device-to-device (D2D) communication structure was completed in 3GPP Release 14 and Release 15, and an effort is currently underway to develop V2X technology based on 5G NR. In NR V2X, unicast communication between the terminal and the terminal, groupcast (or multicast) communication, and broadcast communication are supported.

In order to improve the performance of a wireless communication environment, a reconfigurable intelligent surface (RIS) 140 may be used. Herein, the RIS 140 is a meta surface including controllable passive elements, which may adjust the magnitude and/or phase of a reflected radio wave of a signal. Beamforming in a desired form is possible by controlling the magnitude and/or phase of the reflected radio wave. For example, the signal transmitted from the base station 110 may be reflected by the RIS 140 and transmitted to the terminal 130. The RIS 140 may adjust the magnitude or phase to control a direction from the base station 110 and a direction to the terminal 130. The RIS 140 may be relatively unrestricted in installation place and may have a low cost.

In a millimeter wave (mmWave) frequency band, path loss increases, and multi-path fading loss increases due to a decrease in diffraction. Accordingly, deterioration of a link budget occurs. High-gain antennas may be used for a base station and a terminal in the mmWave frequency band to compensate for propagation loss. However, since the high-gain antenna for compensating propagation loss has a narrow beam width, a communication link is vulnerable to obstacles. At least a portion of the signal may be blocked due to obstacles between the transmitting end and the receiving end. Since the signal does not normally reach the receiving end, deterioration in communication performance may occur. A method for reducing path loss due to obstacles is therefore desirable.

To reduce path loss due to obstacles, 'cloaking' technology may be used to make the obstacles electrically transparent. This cloaking technology is a method of attaching a meta surface or a frequency selective surface (FSS) to a surface of an obstacle, to make the obstacle electrically transparent. Using cloaking technology, the obstacle becomes electrically transparent by making the radio waves bypass the obstacle or by canceling the scattering that the obstacle causes. However, since the meta-surface or FSS must be disposed on the obstacle, the cloaking technology have a disadvantage of being available only in situations where the obstacle is fixed. In addition, the cloaking technology is difficult to apply to the shape of a complex obstacle because a structure must be attached to the surface of the obstacle.

To reduce performance degradation due to an obstacle, a frequency selective surface (FSS) including a liquid crystal layer may be used. The FSS may be disposed in the base station 110, the terminal 120, or the RIS 140, or may be disposed in a device related to the base station 110, the terminal 120, or the RIS 140. Hereinafter, the present disclosure describes a technique for reducing performance degradation due to an obstacle by adjusting an impedance distribution for the FSS in a wireless communication system.

Figure 2:
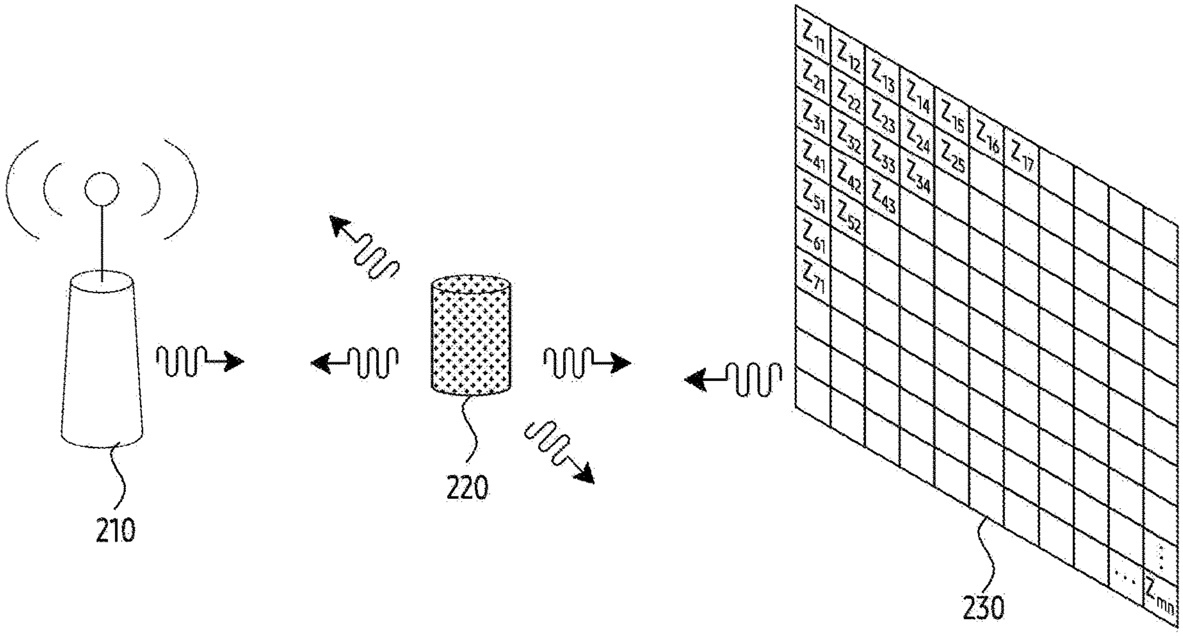
FIG. 2 illustrates an example of a wireless communication environment including a frequency selective surface (FSS) according to various embodiments.

FIG. 2 illustrates an example of a wireless communication environment including a frequency selective surface (FSS) according to various embodiments. Herein, an FSS is a structure in which conductive patterns or shapes are periodically arranged on a dielectric substrate, and has a filter characteristic that selectively passes or reflects a specific frequency band of incident plane waves. In general, an operating frequency may be determined by inductance or capacitance components of a unit cell periodically arranged. The FSS may include an adjustable element (e.g., a voltage of a liquid crystal layer) that affects capacitance or inductance that determine electrical characteristics for each unit cell.

Referring to FIG. 2, a signal source 210 may transmit a signal. For example, the signal source 210 may be the base station 110. As another example, the signal source 210 may be the terminal 120. As another example, the signal source 210 may be a separate node that performs functions of the base station 110 or the terminal 120 (e.g., radio unit (RU), distributed unit (DU), central unit (CU), vehicle, CPE, integrated access and backhaul (IAB)).

The signal transmitted from the signal source 210 is radiated into the air through a wireless channel. The signal source 210 may be a transmitting end. The signal may be transmitted to a receiving end. The FSS 230 may be a component of the receiving end. The receiving end may receive the signal from the signal source 210. For example, the receiving end may be the base station 110. As another example, the receiving end may be the terminal 120. As another example, the receiving end may be RIS 140. As another example, the receiving end may be a separate node performing the function of the base station 110 or the terminal 120. The obstacle 220 disposed between the transmitting end and the receiving end, that is, between the signal source 210 and the FSS 230, interferes with the propagation path of the signal, resulting in an impeded signal. In particular, in high-frequency communication environments such as the mmWave band (e.g., FR2, FR2-1, FR2-2 in NR) or Terahertz band, performance degradation by the obstacle 220 due to multi-path fading loss occurs more frequently.

The FSS 230 may be a component of a receiving end corresponding to the signal source 210. The FSS 230 may include a structure in which conductive patterns or shapes are periodically arranged on a dielectric substrate. For example, the FSS 230 may include unit cells corresponding to M rows (M is a natural number) and N columns (N is a natural number). The characteristic conversion $Z_{ij}$ (i is a horizontal position and j is a vertical position) provided in each unit cell may be independent. The FSS 230 has a filter characteristic that selectively passes or reflects a specific frequency band of a signal incident to the FSS 230. As the electrical component of the unit cell having the liquid crystal layer of the FSS 230 is adjusted, the filter characteristics may be reconstructed. Through reconstruction of the filter characteristics, the influence of the obstacle 220 at the receiving end may be reduced. Hereinafter, in the present disclosure, a device for the FSS 230 may be referred to as an FSS device. The FSS device may include the FSS 230 and a device or other mechanism for controlling the FSS 230, which may be disposed internally or externally to the FSS 230. The receiving end may include an FSS device. An exemplary configuration of the FSS device is described with reference to FIG. 3.

Figure 3:
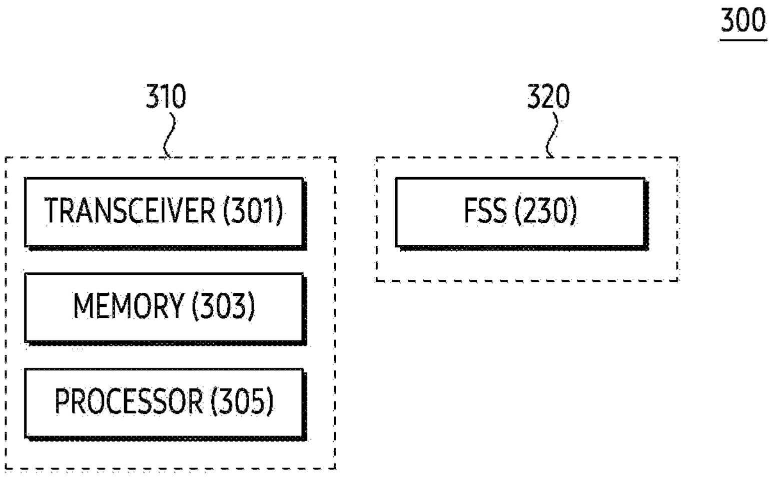
FIG. 3 illustrates an example of a functional configuration of an FSS device according to various embodiments.

FIG. 3 illustrates an example of a functional configuration of an FSS device according to various embodiments.

Referring to FIG. 3, the FSS device 300 (e.g., the FSS 230 of FIG. 2) may include a transceiver 301, a memory 303, and a processor 305.

The transceiver 301 performs functions for transmitting and receiving signals through a wireless channel. For example, the transceiver 301 performs a conversion function between a baseband signal and a bit string according to a physical layer standard of a system. For example, when data is transmitted, the transceiver 301 may generate complex symbols by encoding and modulating a transmission bit string. For example, when data is received, the transceiver 301 may restore the received bit string through demodulation and decoding the baseband signal. The transceiver 301 may up-convert the baseband signal into a radio frequency (RF) band signal, transmit the signal through an antenna (e.g., FSS 230) and down-convert the RF band signal received through the antenna (e.g., FSS 230) into a baseband signal. To this end, the transceiver 301 may include components such as a transmission filter, a reception filter, an amplifier, a mixer, an oscillator, a digital to analog converter (DAC), an analog to digital converter (ADC), and the like. The transceiver 301 according to embodiments may be operably coupled to the FSS 230. According to an embodiment, the transceiver 301 may receive signals transmitted from the transmitting end (e.g., the signal source 210). The FSS 230 may output the converted signals by reflecting or selectively passing the incident signals. The transceiver 301 may receive the converted signals outputted from the FSS 230.

As described above, the transceiver 301 transmits and receives signals. Accordingly, the transceiver 301 may be referred to as a 'transmission unit', a 'reception unit', or a 'transmission/reception unit'. In the following description, the transmission and reception performed through a wireless channel, a backhaul network, an optical cable, Ethernet, and other wired route are used as a meaning including the processing as described above performed by the transceiver 301. According to an embodiment, the transceiver 301 may provide an interface for performing communication with other nodes in the network. In other words, the transceiver 301 may convert a bit string transmitted between nodes (e.g., access nodes, base stations, upper and lower nodes, a core network, etc.) into a physical signal, and may convert a physical signal received from another node into a bit string.

The memory 303 may store data such as a basic program, an application program, and setting information for an operation of the FSS device 300. The memory 303 may be composed of a volatile memory, a nonvolatile memory, or a combination of a volatile memory and a nonvolatile memory. And the memory 303 may provide stored data according to a request of the processor 305. According to an embodiment, the memory 303 may store refraction information on the FSS 230. For example, the refraction information may include information on a refraction index (refraction index) for each cell of the FSS 230.

The processor 305 controls overall operations of the FSS device 300. For example, the processor 305 may read data from and write data to the memory 303. For example, the processor 305 may transmit and receive signals through the transceiver 301. Although one processor is illustrated in FIG. 3, embodiments of the present disclosure are not limited thereto. The FSS device 300 may include at least one processor to perform embodiments of the present disclosure. The processor 305 may be referred to as a control unit or a control means. According to embodiments, the processor 305 may control the device to perform operations of the FSS device 300 according to embodiments of the present disclosure. According to an embodiment, the FSS device 300 may reconfigure the FSS 230. The FSS device 300 may control a voltage applied to the cells of the FSS 230. The FSS device 300 may change a frequency response characteristic for each cell of the FSS 230 by adjusting a voltage applied to a liquid crystal layer of the FSS 230.

According to an embodiment, the components of the FSS device 300 may be implemented within one node. Hereinafter, primarily, the FSS device 300 is described as one node including the FSS 230, but embodiments of the present disclosure are not limited thereto. For examples, according to another embodiment, the FSS device 300 may be implemented by being divided into a first entity 310 and a second entity 320. The first entity 310 may include a transceiver 301, a memory 303, and a processor 305. The second entity 320 may include the FSS 230. The FSS 230 may be disposed in an entity different from components for signal processing (e.g., the transceiver 301, the memory 303, and the processor 305) to receive signals through a wireless channel.

The FSS 230 may include a plurality of unit cells. Hereinafter, the structure and shape of each unit cell will be described with reference to FIGS. 4A to 4C.

Figure 4A:
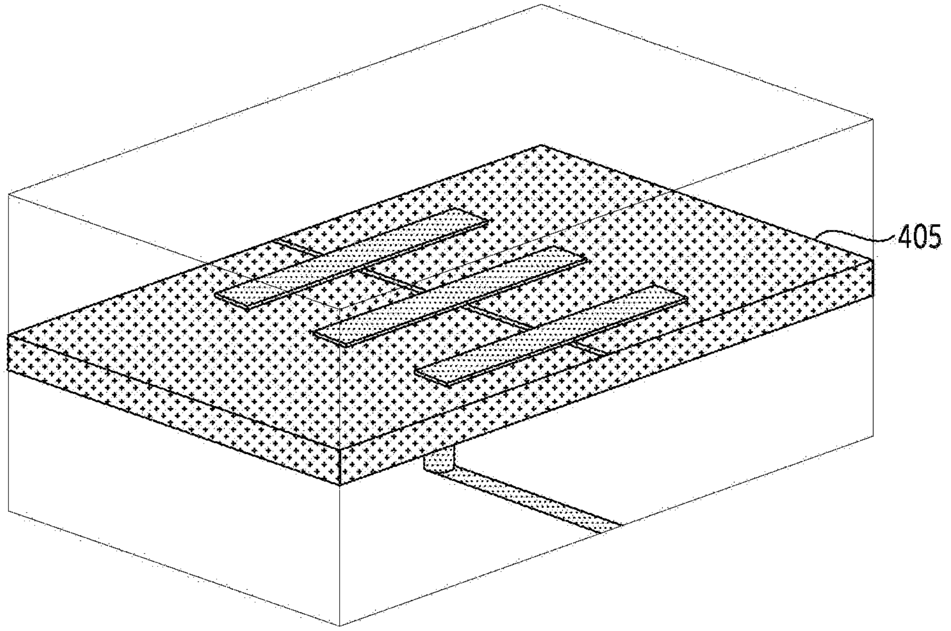
FIGS. 4A to 4C illustrate an example of a unit cell of an FSS according to an exemplary embodiment.
Figure 4B:
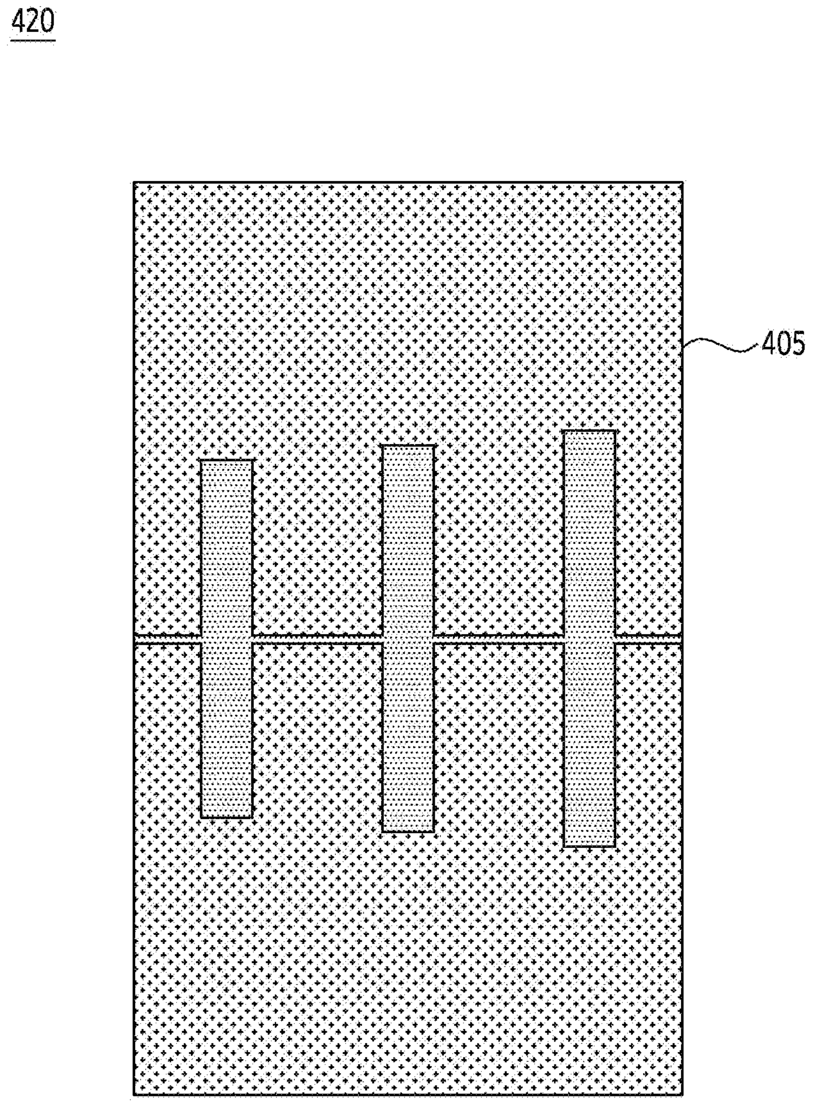
Figure 4C:
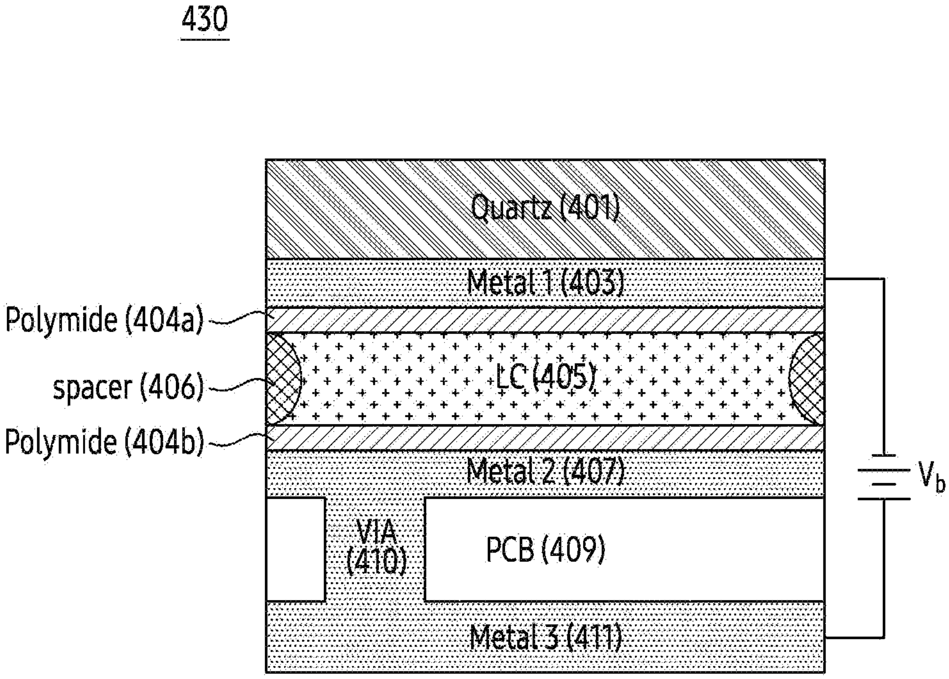

FIGS. 4A to 4C illustrate an example of a unit cell of an FSS according to an exemplary embodiment. Referring to FIG. 4A, a perspective view 400 of a unit cell viewed from the outside is presented. The unit cell may include a liquid crystal layer 405. The liquid crystal layer 405 may be used to change the magnitude component and phase component of a power supplied signal or a received signal. The liquid crystal layer 405 may be used to change the magnitude component of the power supplied signal or the received signal. The liquid crystal layer 405 may be used to change a phase component of the power supplied signal or the received signal. Based on the permittivity of the liquid crystal layer 405, the signal may be refracted in the liquid crystal layer 405. For example, a processor (e.g., the processor 305) of the FSS device may apply DC to a biasing line. The processor 305 may individually control the DC bias for the unit cell ground through the via. As the DC bias is changed, the voltage applied to the unit cell is changed. The liquid crystal layer 405 may include a liquid crystal having permittivity anisotropy. The permittivity of liquid crystal layer 405 depends on an applied voltage, and therefore may be set and adjusted in a variable manner by adjusting the applied voltage. The changing permittivity may in turn change an electrical characteristic of a signal passing through the unit cell.

Referring to FIG. 4B, a plan view 420 of a unit cell viewed from above is presented. The unit cell may include a plurality of dipoles (e.g., in the illustrated unit cell, three dipoles). Different resonance frequencies may provide broadband. According to an embodiment, the unit cell may include dipoles having different lengths for a broadband operation. According to an embodiment, a plurality of dipoles of the unit cell may have different lengths. According to an embodiment, intervals between a plurality of dipoles of the unit cell may be different from each other. Different lengths or different intervals make the resonance frequency in each dipole different. Forming of another resonant frequency within an adjacent range may extend a frequency range that provides a gain of more than a certain decibel. The extended frequency range may be broadband.

Referring to FIG. 4C, a cross-sectional view 430 illustrates a stacked structure of unit cells. The unit cell may include a structure stacked with a quartz layer 401, a first metal layer 403, a liquid crystal layer 405, a second metal layer 407, a PCB 409, and a third metal layer 411. The liquid crystal layer 405 may be disposed between the first metal layer 403 and the second metal layer 407. For the liquid crystal layer 405, polyamides 404*a* and 404*b* may be disposed on the upper and lower surfaces of the liquid crystal layer 405, respectively. The polyamide 404*a* may be disposed between the first metal layer 403 and the liquid crystal layer 405. The polyamide 404*b* may be disposed between the liquid crystal layer 405 and the second metal layer 407. The liquid crystal layer 405 may include a liquid crystal having permittivity anisotropy. A spacer 406 may be disposed to fix the liquid crystal of the liquid crystal layer 405. The spacer 406 may be disposed between the polyamide 404*a* coupled to the first metal layer 403 and the polyamide 404*b* coupled to the second metal layer 407.

In order to transmit a fed signal or a signal received from the outside, a via 410 may be formed over the layers of the PCB 409. The second metal layer 407 and the third metal layer may be electrically connected to each other through the via 410. Accordingly, an electrical connection may be formed across the first metal layer 403, the liquid crystal layer 405, the second metal layer 407, and the third metal layer 411 of the stacked structure. According to an embodiment, the processor (e.g., the processor 305) may apply a voltage to the unit cell. For example, a voltage (e.g., $V_b$) may be applied between the first metal layer 403 and the third metal layer 411. The permittivity of the liquid crystal layer 405 disposed between the first metal layer 403 and the third metal layer 411 depends on the applied voltage. Permittivity may therefore be set and adjusted in a variable manner by adjusting the applied voltage. The varying permittivity may in turn change an electrical characteristic of the signal passing through the unit cell.

In FIGS. 4A to 4C, three dipole antennas are illustrated in unit cells, but embodiments of the present disclosure are not limited thereto. According to an embodiment, more than three antennas (e.g., four or five antennas) or less than three antennas (e.g., two antennas) may be disposed in the unit cell. In addition, the type of antenna disposed in the unit cell is illustrated as a dipole, but embodiments of the present disclosure are not limited thereto. According to another embodiment, a unit cell structure having a liquid crystal layer may include a radiation layer using at least one of a patch antenna, a microstrip antenna, a horn antenna, or a slot antenna for receiving a signal.

Figure 5A:
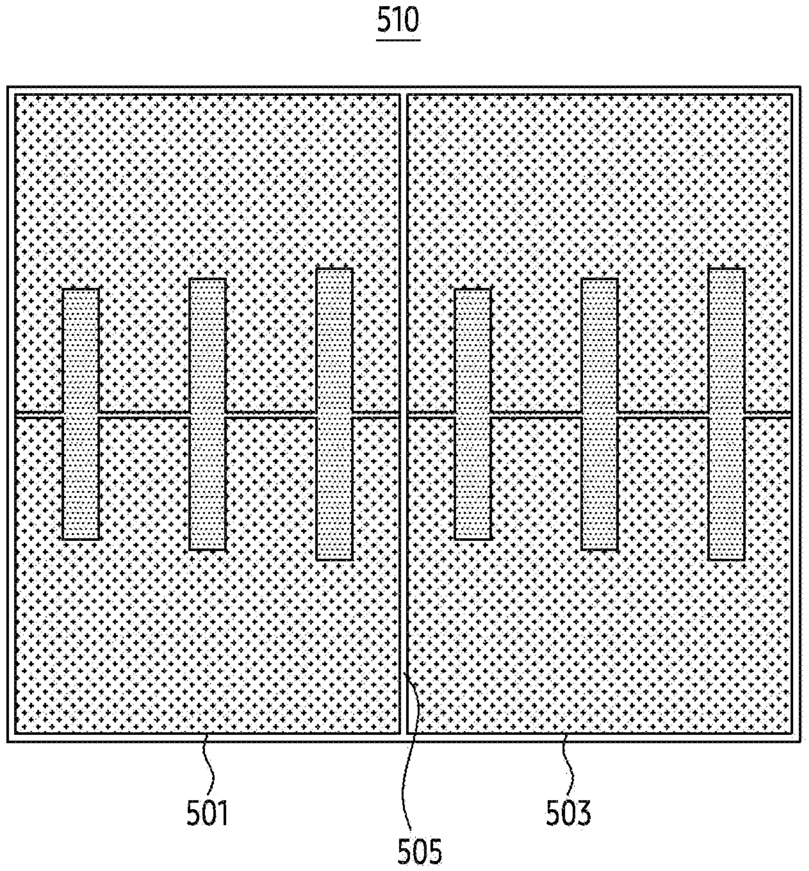
FIGS. 5A to 5B illustrate an example of an FSS structure of an FSS device according to an exemplary embodiment.
Figure 5B:
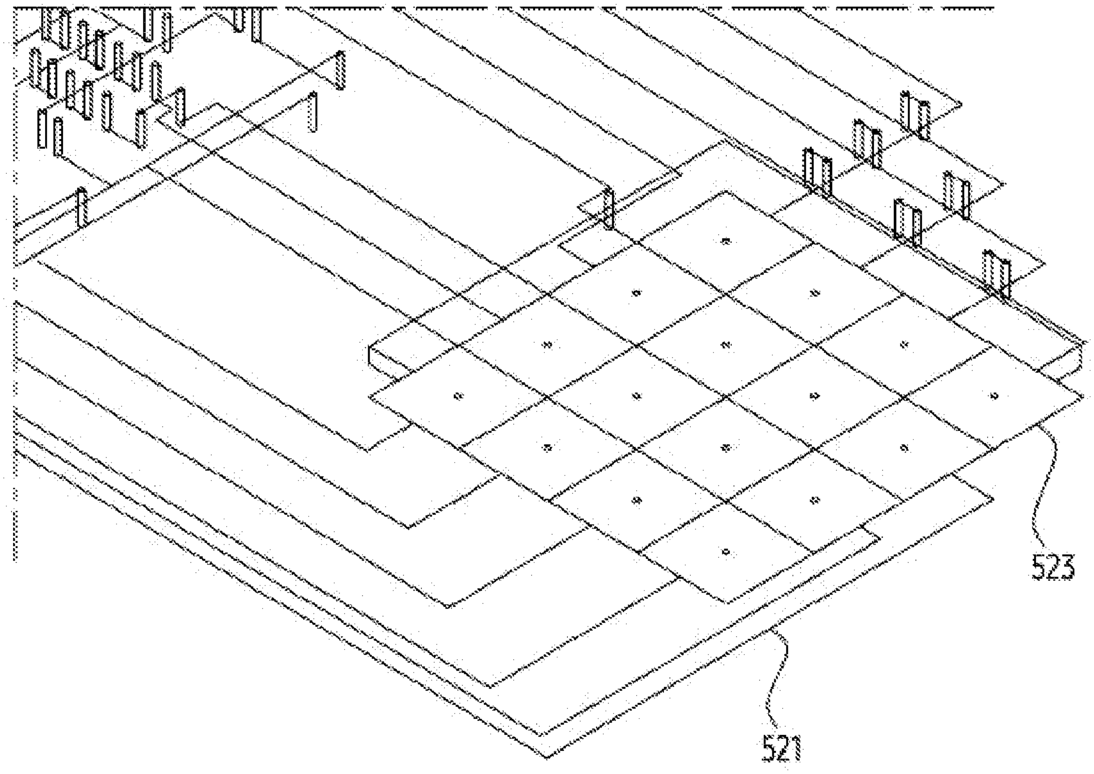

FIGS. 5A to 5B illustrate an example of an FSS structure of an FSS device according to an exemplary embodiment.

Referring to FIG. 5A, an FSS (e.g., the FSS 230) of an FSS device (e.g., the FSS device 300) may include a plurality of unit cells. A plan view 510 of two unit cells viewed from above is presented. The unit cells may include a first unit cell 501 and a second unit cell 503. As described with reference to FIGS. 4A to 4C, lengths of dipoles in each unit cell may be different from each other. In addition, intervals between the dipoles within the cell may be different.

According to the present disclosure embodiments, the FSS device 300 may apply individual voltages to each of the unit cells of the FSS 230. The FSS device 300 may perform reconfiguration of the FSS 230 by applying a specific to voltage to the unit cell. To enable individual voltage application, an electrical separation may be provided between unit cells. According to an embodiment, in the ground plane of the unit cells of the FSS 230, a gap between unit cells may be arranged for electrical separation between the unit cells. For example, a gap 505 may be disposed between the first unit cell 501 and the second unit cell 503. For example, the length of the gap may be about 100 micrometers (μm).

Referring to FIG. 5B, a schematic diagram 520 illustrates biasing lines applied to each unit cell of the FSS 230. Individual biasing lines (e.g. biasing line 521) may be connected to each unit cell (e.g. unit cell 523). The FSS device 300 may individually control a voltage applied to the unit cell. For example, voltage magnitudes applied between the unit cells may be different. Permittivity of the liquid crystal layer in each of the unit cells may be different from each other, based for example on the applied voltage magnitude, the physical configuration of the unit cell, or a combination thereof.

Figure 5C:
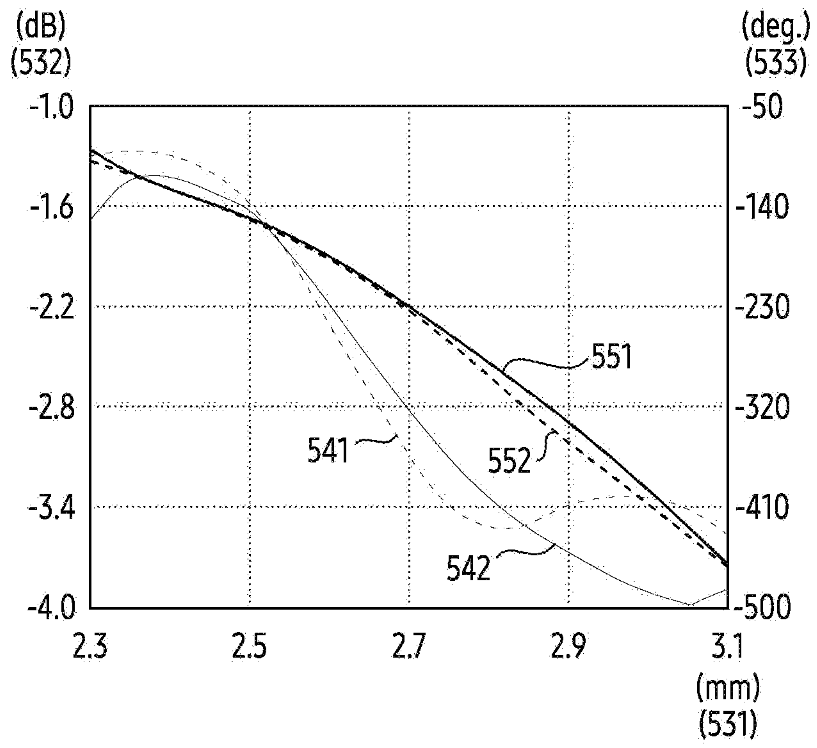
FIG. 5C illustrates an example of a reflection characteristic according to a ground gap, according to an exemplary embodiment.

FIG. 5C illustrates an example of a reflection characteristic according to a ground gap, according to an exemplary embodiment. Herein, a ground gap is a gap disposed to form a physical interval between unit cells within the ground plane of the FSS (e.g., the FSS 230).

Referring to FIG. 5C, the graph 530 illustrates reflection characteristics for each permittivity. The horizontal axis 531 of the graph 530 indicates the permittivity (unit: mm) of a liquid crystal layer (e.g., the liquid crystal layer 405). The left vertical axis 532 of the graph 530 indicates a reflection magnitude (unit: decibel (dB)). The right vertical axis 533 of the graph 530 indicates a reflection phase (unit: degree). For this example, the graph 530 is based on the FSS 230 receiving a signal transmitted in a band of about 37 GHz, but similar results are seen using other frequency bands.

The first line 541 indicates the reflection magnitude of the FSS without a ground gap. The second line 542 indicates the reflection magnitude of the FSS including the ground gap. Comparing the first line 541 and the second line 542, the difference in performance change due to the ground gap is within a threshold range. In addition, an improvement in the gain may be identified in a certain section.

The third line 551 indicates a reflection phase of the FSS including the ground gap. The fourth line 552 indicates a reflection phase of the FSS without a ground gap. Comparing the third line 551 and the fourth line 552, the difference in performance change due to the ground gap is within a threshold range. In addition, an improvement in the gain may be identified in a certain section.

Figure 6A:
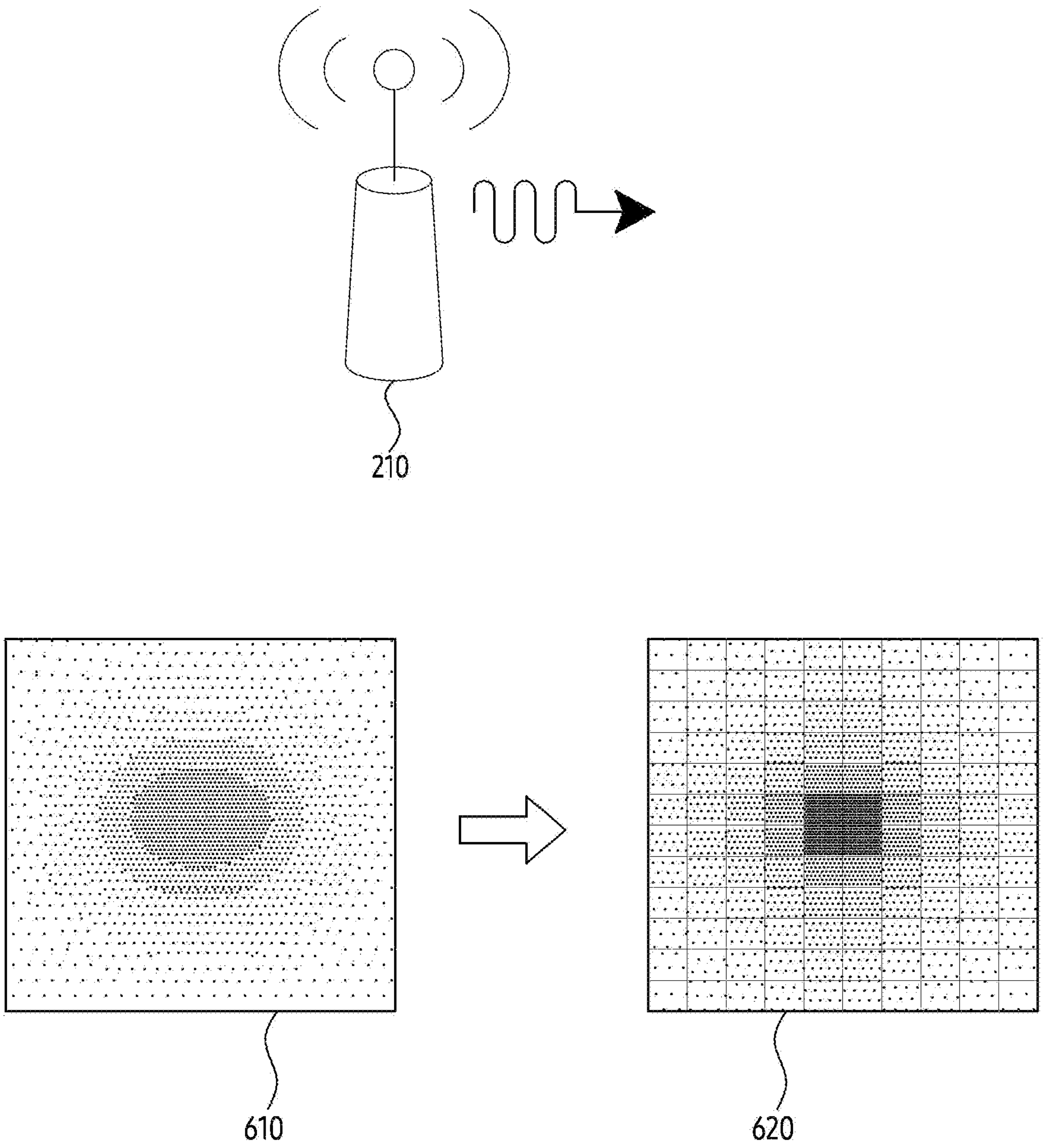
FIGS. 6A to 6B illustrate examples of a mapping pattern of an FSS device according to an exemplary embodiment.
Figure 6B:
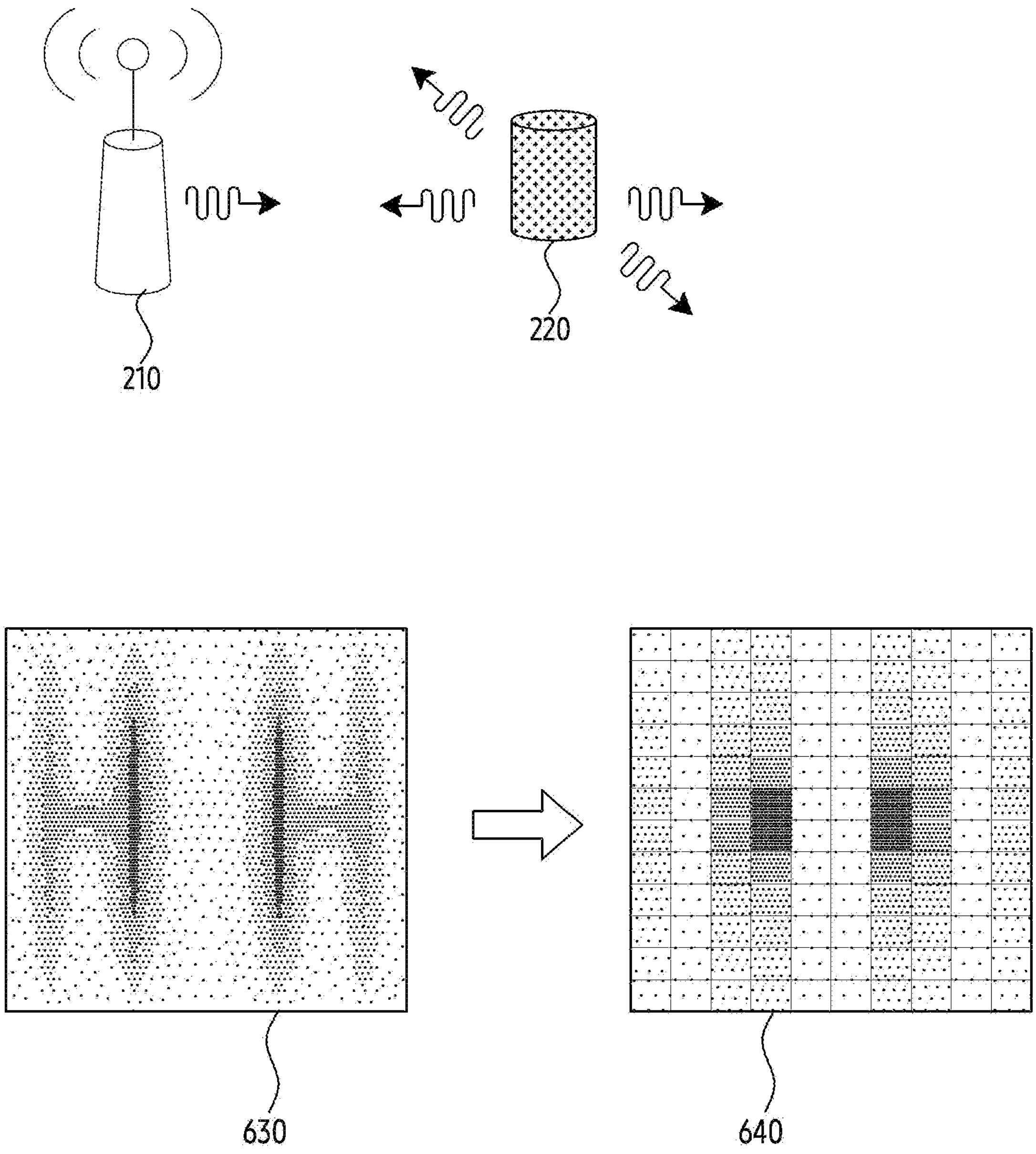

FIGS. 6A to 6B illustrate examples of mapping patterns of an FSS device according to an embodiment. The FSS (e.g., the FSS 230) of the FSS device (e.g., the FSS device 300) may include a planar surface. At least a portion of the planar surface may include unit cells in a rectangular area arranged as M pieces in one direction and N pieces in another direction perpendicular to the one direction. The FSS 230 may thereby include M×N piece cells. Each unit cell may correspond to (m,n) (where m is an integer of 1 to M, and n is an integer of 1 to N). Herein, a mapping pattern is a pattern sampled so that the values of the received incident pattern are mapped to each unit cell of the FSS.

Referring to FIG. 6A, in a first example wireless communication environment without obstacles, a first incident pattern 610 ($\vec{E_1}$) indicates a distribution of signals incident on the FSS 230 of the FSS device 300. The signal ($\vec{E_a}$) of the signal source 210 may be transmitted to the FSS device 300 through a wireless channel in the first example wireless communication environment. Accordingly, the FSS device 300 may normally receive a signal ($\vec{E_a}$) of the signal source 210 without a separate blockage; that is, the FSS device 300 may receive an unimpeded signal. The signal obtained by the FSS device 300 may correspond to the signal ($\vec{E_a}$) of the signal source 210. As such, the first incident pattern 610 ($\vec{E_1}$) may be derived from the signal ($\vec{E_a}$) at the signal source 210 rather than determined through actual transmission to the FSS device 300.

The FSS device 300 may obtain a first mapping pattern 620 ($\vec{E_1}'$) based on the first incident pattern 610 ($\vec{E_1}$). The FSS device 300 may obtain information on the magnitude of the FSS 230. According to an embodiment, the information on the magnitude of the FSS 230 may include the number of unit cells of the FSS 230. According to an embodiment, information on the magnitude of the FSS 230 may include information on the arrangement of the unit cells. The FSS device 300 may perform sampling on the first incident pattern 610 ($\vec{E_1}$) based on information on the magnitude of the FSS 230. The FSS device 300 may obtain the first mapping pattern 620 ($\vec{E_1}'$) based on the sampling. The first mapping pattern 620 ($\vec{E_1}'$) may be used for a reflection function in the FSS 230. Each of a plurality of elements $\vec{E_1}'(m,n)$ of the first mapping pattern 620 ($\vec{E_1}'$) may correspond to a respective unit cell (m,n) of the FSS 230, and may be determined based on at least one sample from the corresponding unit cell (m,n). The resulting first mapping pattern 620 ($\vec{E_1}'$) may be thereby derived from the first incident pattern 610 ($\vec{E_1}$).

Referring to FIG. 6B, in a second example wireless communication environment with an obstacle (e.g., the obstacle 220), a second incident pattern 630 ($\vec{E_2}$) indicates a distribution of signals incident on the FSS 230 of the FSS device 300. The signal ($\vec{E_a}$) of the signal source 210 may be scattered or blocked after colliding with the obstacle 220 while transmitted through a wireless channel in the second example wireless communication environment. At least a part of the signal ($\vec{E_a}$) of the signal source 210 may still be received by the FSS device 300. However, it is difficult for the FSS device 300 to normally receive a signal from the signal source 210 due to blockage of the obstacle 220. Instead, a reflection vector ($\vec{E_s}$) may occur due to the obstacle 220. The signal obtained by the FSS device 300 may be different from the signal ($\vec{E_a}$) of the signal source 210 due to the reflection vector ($\vec{E_s}$) of the obstacle 220; that is, the FSS device 300 may receive an impeded signal. The FSS device 300 may obtain the second incident pattern 630 ($\vec{E_2}$) according to the signal ($\vec{E_a}$) of the signal source 210 and the reflection vector ($\vec{E_s}$) of the obstacle 220.

The FSS device 300 may acquire the second mapping patterns 640 ($\vec{E_2}'$) based on the second incident pattern 630 ($\vec{E_2}$). The FSS device 300 may obtain information on the magnitude of the FSS 230. According to an embodiment, the information on the magnitude of the FSS 230 may include the number of unit cells of the FSS 230. The FSS device 300 may perform sampling on the second incident pattern 630 ($\vec{E_2}$) based on information on the size of the FSS 230. The FSS device 300 may obtain a second mapping pattern 640 ($\vec{E_2}'$) based on the sampling. The second mapping pattern 640 ($\vec{E_2}'$) may be used for a reflection function in the FSS 230. Each of a plurality of elements $\vec{E_2}'(m,n)$ of the second mapping pattern 640 ($\vec{E_2}'$) may correspond to a respective unit cell (m,n) of the FSS 230, and may be determined based on at least one sample from the corresponding unit cell (m,n). The resulting second mapping pattern 640 ($\vec{E_2}'$) may be thereby derived from the second incident pattern 630 ($\vec{E_2}'$).

Figure 7:
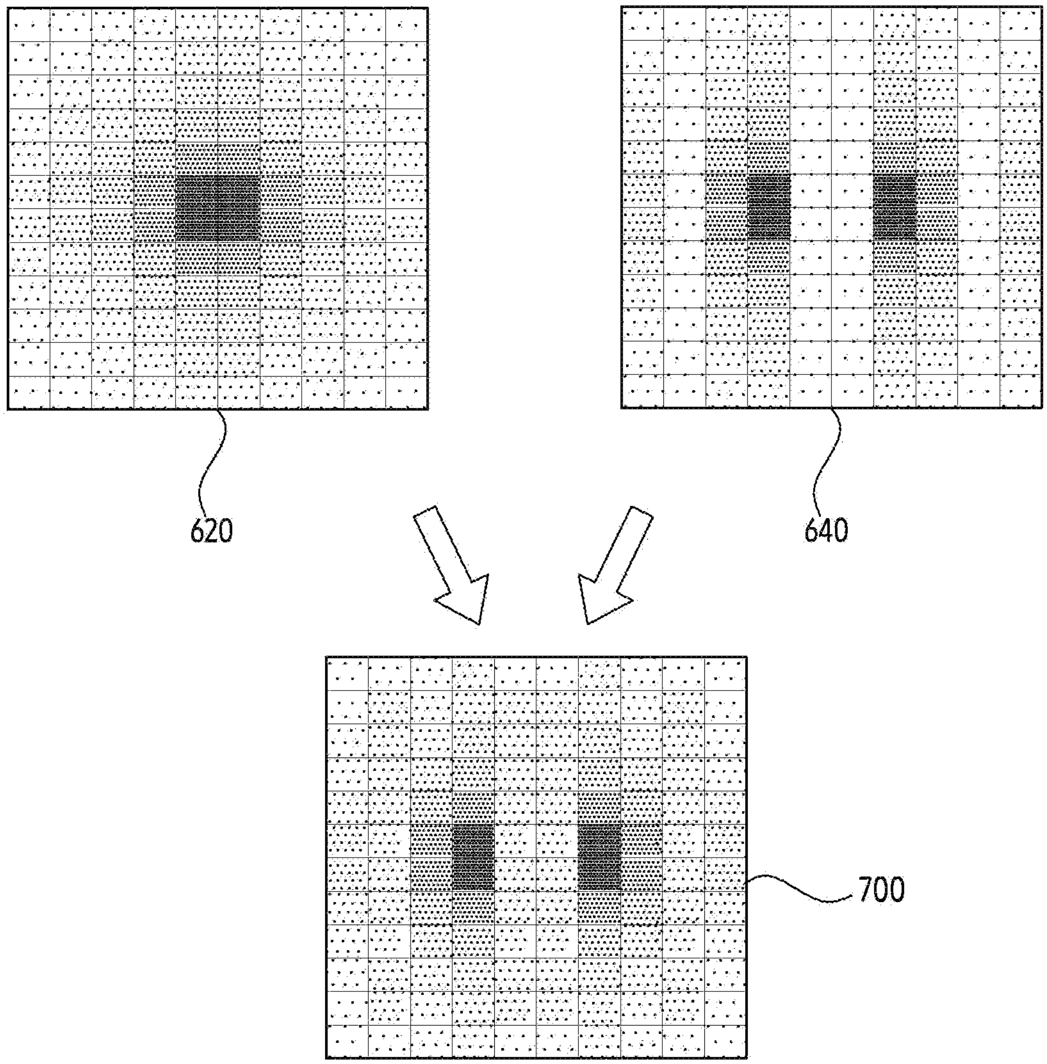
FIG. 7 illustrates an example of a blocking pattern according to an exemplary embodiment.

FIG. 7 illustrates an example of a blocking pattern according to an exemplary embodiment. The FSS (e.g., the FSS 230) of the FSS device (e.g., the FSS device 300) may obtain information of the obstacle 220 so that the signal is not lost due to the obstacle 220. For example, a pattern of a signal incident on the FSS 230 may be changed due to the obstacle 220. The obtained information may be used to make the obstacle 220 electrically transparent.

Referring to FIG. 7, the FSS device 300 may obtain a blocking pattern 700. For example, the FSS device 300 may obtain the blocking pattern 700 based on the first mapping pattern 620 ($\vec{E_1}'$) of FIG. 6A and the second mapping pattern 640 ($\vec{E_2}'$) of FIG. 6B. The FSS device 300 may obtain blocking patterns 700 ($\vec{E_{FSS}}$) based on the difference between the first mapping pattern 620 ($\vec{E_1}'$) and the second mapping pattern 640 ($\vec{E_2}'$). For example, the first mapping pattern 620 ($\vec{E_1}'$) may correspond to the signal $\vec{E_a}$ of the signal source 210. The second mapping pattern 640 ($\vec{E_2}'$) may correspond to the signal $\vec{E_a}$ of the signal source 210 and the reflection vector ($\vec{E_s}$) of the obstacle 220; for example, the second mapping pattern 640 ($\vec{E_2}'$) may correspond to a sum ($\vec{E_a}+\vec{E_s}$) of the signal $\vec{E_a}$ and the reflection vector ($\vec{E_s}$). Based on the difference between the first mapping pattern 620 ($\vec{E_1}'$) and the second mapping pattern 640 ($\vec{E_2}'$), the FSS device 300 may acquire a blocking pattern 700 ($\vec{E_{FSS}}$) corresponding to the reflection vector ($\vec{E_s}$) of the obstacle 220.

The first incident pattern 610 and the first mapping pattern 620 may be obtained in advance based on signals incident before the signal is blocked due to the obstacle 220. The FSS device 300 may obtain the first incident pattern 610 and the first mapping pattern 620 in advance before the wireless communication environment changes due to external factors such as the obstacle 220. The second incident pattern 630 and the second mapping pattern 640 may be obtained based on signals incident by scattering signals or blocking at least a part thereof due to the obstacle 220, after the wireless communication environment changes.

The FSS device 300 may obtain spatial information related to the wireless channel and the wireless communication environment through the blocking pattern 700. According to an embodiment, the FSS device 300 may recognize, based on the blocking pattern 700, that a spatial change has occurred in the wireless channel, such as the obstacle 220. For example, if gain values different from the first mapping pattern 620 (i.e., the second mapping pattern 640) are detected, the FSS device 300 may recognize that the physical path environment of the wireless communication channel is changed due to the obstacle 220.

Although one obstacle 220 is exemplarily mentioned in the above-described descriptions, embodiments of the present disclosure are not limited thereto. The FSS device 300 may obtain information on a space located in a current signal transmission path regardless of the number or location of obstacles.

Figure 8:
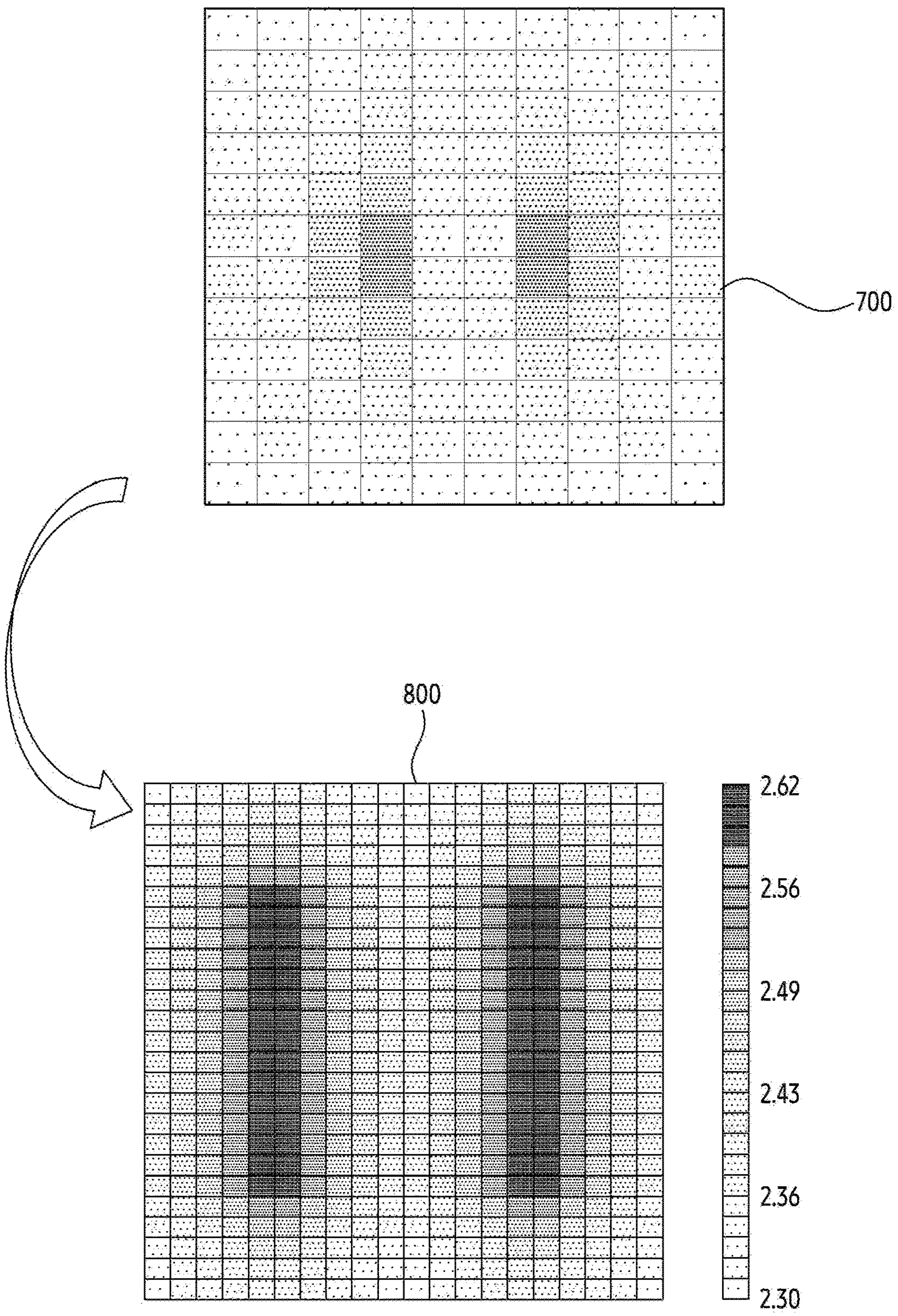
FIG. 8 illustrates an example of refraction information according to an exemplary embodiment.

FIG. 8 illustrates an example of refraction information according to an exemplary embodiment.

Referring to FIG. 8, the FSS device (e.g., the FSS device 300) may obtain the refraction pattern 800 based on the blocking pattern 700. The refraction pattern 800 may indicate refraction information (e.g., a refraction index) in the liquid crystal layer of each unit cell.

The FSS device 300 may allocate the refraction pattern 800 to the FSS (e.g., the FSS 230) based on the blocking pattern 700. The FSS device 300 may identify signal information of a unit cell (e.g., unit cell (m,n)) of the FSS 230 from the blocking pattern 700. The FSS device 300 may normally restore a signal incident on the unit cell based on the signal information. For example, the FSS device 300 may apply the signal information of the unit cell in reverse so that the signal incident to the unit cell is not affected by spatial constraints (e.g., obstacle 220). In other words, the FSS device 300 may obtain an intended signal from a signal source (e.g., the signal source 210) by inversely applying a change caused by an obstacle.

According to an embodiment, for normal restoration of a signal incident to the unit cell, the FSS device 300 may determine refraction information (e.g., a refraction index) for the unit cell based on the blocking pattern 700. Herein, the refraction information may be used to change the magnitude and/or phase of a signal passing through the liquid crystal layer. In other words, the refraction information may be used to vary the electrical length of the signal. The FSS device 300 may determine refraction information for each unit cell among a plurality of unit cells of the FSS 230.

The FSS device 300 may determine voltage information for the FSS 230 based on the refraction pattern 800. The FSS device 300 may determine voltage information for the FSS 230 based on refraction information for each unit cell. The refraction information of the liquid crystal layer depends on the permittivity of the liquid crystal layer. The FSS device 300 may obtain a value of permittivity for the specific unit cell based on refraction information for the specific unit cell; more specifically, the FSS device 300 may determine a value of permittivity which will achieve the desired refraction index for the specific unit cell. Accordingly, the FSS electronic device 300 may determine a voltage to apply to the specific unit cell based on the desired permittivity. The voltage information may include a voltage for each unit cell.

In FIGS. 6A to 8, after sampling from the incident patterns (e.g., the first incident pattern 610 and the second incident pattern 630) to derive mapping patterns (e.g. the first mapping pattern 620 and the second mapping pattern 640), an example of obtaining a quantized blocking pattern 700 based on the difference between the sampled mapping patterns is described. However, embodiments of the present disclosure are not limited thereto. Obtaining a blocking pattern by directly sampling a difference between incident patterns and determining refraction information based on the blocking pattern may also be understood as an operation of the FSS device 300 according to an embodiment of the present disposition.

Figure 9A:
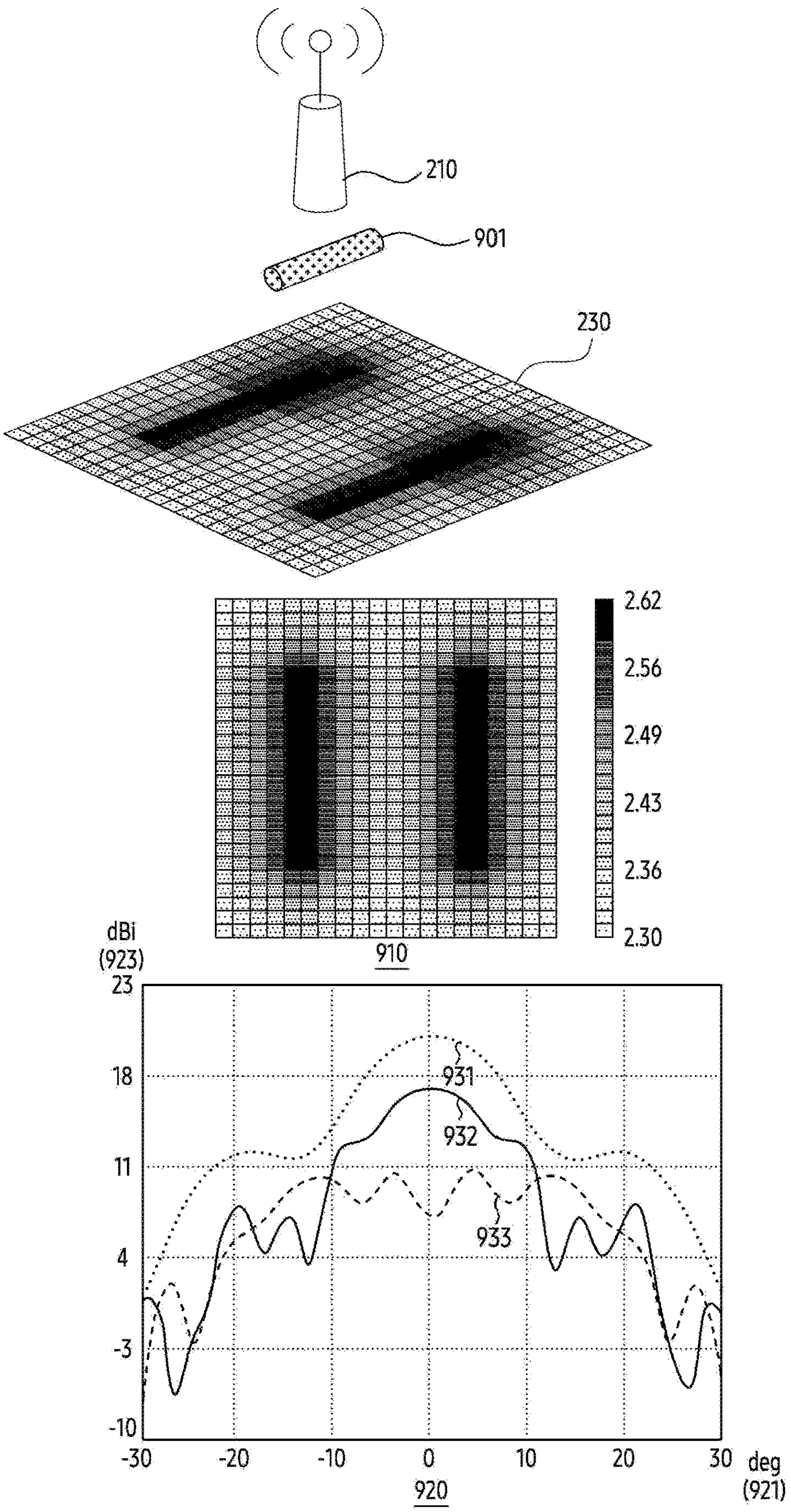
FIG. 9A illustrates an example of an FSS reconfiguration according to an exemplary embodiment.

FIG. 9A illustrates an example of an FSS reconfiguration according to an exemplary embodiment. Herein, an FSS reconfiguration indicates that the FSS device (e.g., the FSS device 300) resets a voltage value for each of the unit cells of the FSS (e.g., the FSS 230). The permittivity of the liquid crystal layer of the unit cell may be changed by the reset voltage. According to the changing permittivity, the signal incident on the FSS 230 may be reflected in different magnitude and/or different phase.

Referring to FIG. 9A, an obstacle 901 may be disposed between the signal source 210 and the FSS 230. The FSS device 300 may obtain an incident pattern (hereinafter, a reception pattern) of a signal incident on the FSS 230 due to the obstacle 901. The FSS device 300 may also obtain another incident pattern (hereinafter, a basic pattern) for the signal source 210. Herein, a basic pattern is a pattern in which signals received from the signal source 210 are incident on the FSS 230 through a wireless channel before the obstacle 901 is disposed. The FSS device 300 may obtain a blocking pattern based on the difference between the reception pattern and the basic pattern. Herein, a blocking pattern is a pattern describing a gain change due to the obstacle 901 in terms of the gain of the FSS 230. The FSS device 300 may obtain refraction information 910 based on the blocking pattern for the obstacle 901. The FSS device 300 may perform FSS reconfiguration based on a mapping of refraction information 910 (e.g., a refraction index) in each unit cell. The FSS device 300 may change permittivity of the unit cell by applying voltage information to the unit cell which corresponds to the refraction information of the unit cell. The FSS device 300 may obtain a radiation pattern for overcoming the obstacle 901 by resetting the permittivity of each unit cells.

The graph 920 indicates a radiation pattern. The horizontal axis 921 of the graph 920 indicates an angle in respect to the boresight (unit: degree). The vertical axis 923 of the graph 920 indicates a gain (unit: decibel isotropic (dBi)). The first line 931 indicates a basic pattern, which is a radiation pattern of the signal source 210. As the signals of the signal source 210 are incident on the FSS 230 without reflection, a radiation pattern as indicated by the first line 931 may be obtained in the FSS 230. The second line 932 indicates a reception pattern in the reconfigured FSS 230 according to embodiments. The third line 933 indicates a reception pattern. The reception pattern refers to a reception pattern in the FSS 230 reflected the loss caused by the obstacle 901 before the FSS reconfiguration.

Referring to the graph 920, the reconfigured FSS 230 corresponds to an effective medium. For example, referring to the gain at 0°, the first line 931 indicates about 21.1 dBi and the third line 933 indicates about 7.0 dBi. That is, the gain is reduced by about 14.1 dB due to the obstacle 901. The FSS 230 according to embodiments may be reconfigured based on refraction information 910. The second line 932 indicates about 16.45 dBi at 0 degrees. It can be seen from graph 920 that the gain increases by about 9.45 dB due to the reconfigured FSS 230.

Figure 9B:
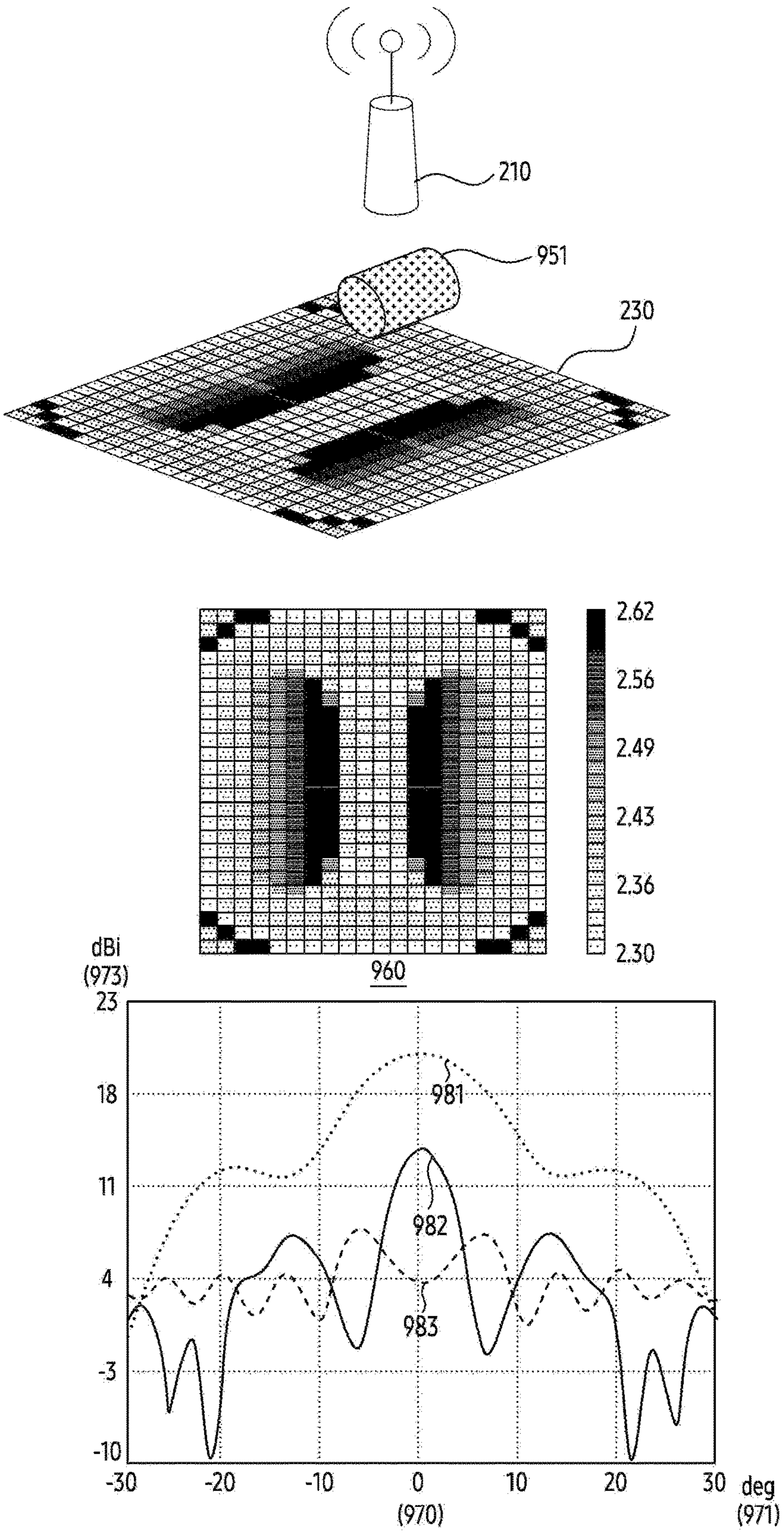
FIG. 9B illustrates another example of an FSS reconfiguration according to an exemplary embodiment.

FIG. 9B illustrates another example of an FSS reconfiguration according to an exemplary embodiment. Herein, an FSS reconfiguration indicates that the FSS device (e.g., the FSS device 300) resets a voltage value for each of the unit cells of the FSS (e.g., the FSS 230). In FIG. 9B, an example in which refraction information is changed due to another obstacle 951 will be described.

Referring to FIG. 9B, an obstacle 951 may be disposed between the signal source 210 and the FSS 230. The FSS device 300 may obtain an incident pattern (hereinafter, a reception pattern) of a signal incident on the FSS 230 due to the obstacle 951. The FSS device 300 may also obtain an incident pattern (hereinafter, a basic pattern) for the signal source 210. Herein, a basic pattern is a pattern in which signals received from the signal source 210 are incident on the FSS 230 through a wireless channel before the obstacle 951 is disposed. The FSS device 300 may obtain a blocking pattern based on the difference between the reception pattern and the basic pattern. Herein, a blocking pattern is a pattern describing a gain change due to the obstacle 951 in terms of the gain of the FSS 230. The FSS device 300 may obtain refraction information 960 based on the blocking pattern for the obstacle 951. The FSS device 300 may perform FSS reconfiguration based on a mapping of refraction information 960 (e.g., a refraction index) in each unit cell. The FSS device 300 may change permittivity of the unit cell by applying voltage information to the unit cell which corresponds to the refraction information of the unit cell. The FSS device 300 may obtain a radiation pattern for overcoming the obstacle 951 by resetting the permittivity for each of the unit cells.

The graph 970 indicates a radiation pattern. The horizontal axis 971 of the graph 970 indicates an angle in respect to the boresight (unit: degree). The vertical axis 973 of the graph 970 indicates a gain (unit: decibel isotropic (dBi)). The first line 981 indicates a basic pattern, which is a radiation pattern of the signal source 210. As the signals of the signal source 210 are incident on the FSS 230 without reflection, a radiation pattern as indicated by the first line 981 may be obtained in the FSS 230. The second line 982 indicates a reception pattern in the reconfigured FSS 230 according to embodiments. The third line 983 indicates a reception pattern in the FSS 230 reflecting the loss caused by the obstacle 951 before the FSS reconfiguration.

Referring to the graph 970, the reconfigured FSS 230 corresponds to an effective medium. For example, referring to the gain at 0°, the first line 981 indicates about 21.1 dBi and the third line 983 indicates about 3.6 dBi. That is, the gain is reduced by about 17.5 dB due to the obstacle 951. The FSS 230 according to embodiments may be reconfigured based on refraction information 960. The second line 982 indicates about 13.9 dBi at 0 degrees. It can be seen from graph 970 that the gain increases by about 10.3 dB due to the reconfigured FSS 230.

Figure 10:
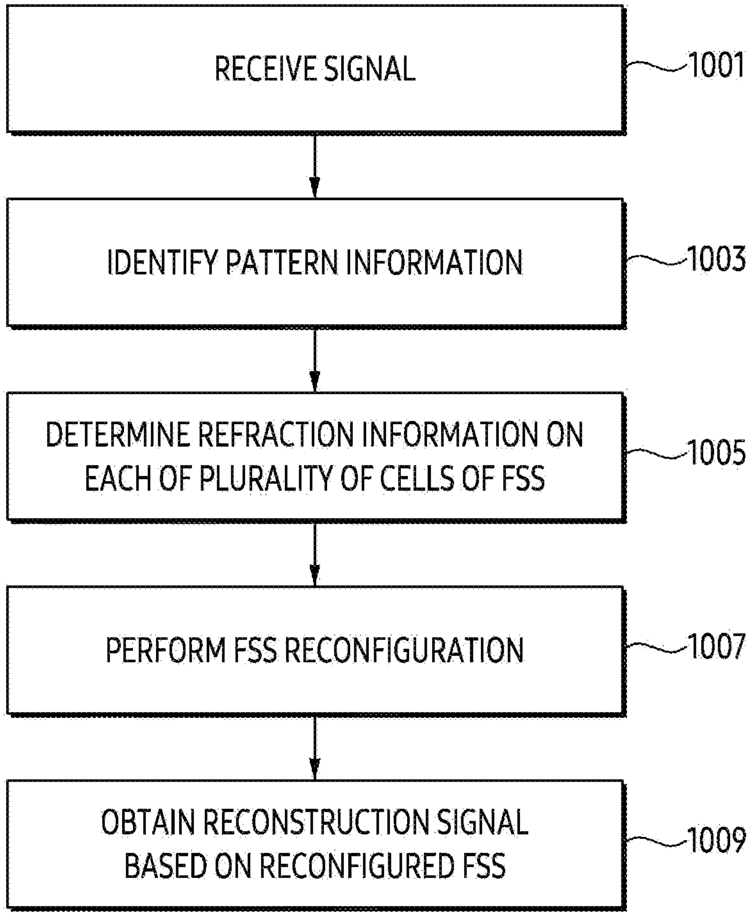
FIG. 10 illustrates an operation flow of an electronic device for reconfiguring an FSS according to an exemplary embodiment.

FIG. 10 illustrates an operation flow of an electronic device for reconfiguring an FSS according to an exemplary embodiment. The electronic device illustrates the FSS device 300 of FIG. 3.

Referring to FIG. 10, in operation 1001, the electronic device may receive a signal. The electronic device may receive a signal from another electronic device. The electronic device may receive a signal based on the FSS (e.g., the FSS 230). The FSS 230 may be in a basic state. Herein, the basic state is a state before changing a voltage applied to each unit cell due to an obstacle; that is, before a reconfiguration as described elsewhere herein.

In operation 1003, the electronic device may identify pattern information. The pattern information may indicate a difference between pattern information for the other electronic device and pattern information actually received from the other electronic device. For example, the electronic device may obtain the first incident pattern 610 (E 1). The electronic device may obtain the first mapping pattern 620 ($\vec{E_1}'$). The electronic device may obtain the second incident pattern 630 ($\vec{E_2}$). The electronic device may obtain the second mapping pattern 640 ($\vec{E_2}'$). The electronic device may obtain a blocking pattern 700 based on a difference between the first mapping pattern 620 ($\vec{E_1}'$) and the second mapping pattern 640 ($\vec{E_2}'$) (or a difference between the first incident pattern 610 ($\vec{E_1}$) and the second incident pattern 630 ($\vec{E_2}$)). The blocking pattern 700 may indicate a spatial constraint of a wireless channel between the electronic device and the other electronic device. Based on the distribution of the blocking pattern 700, the electronic device may identify that one or more obstacles are disposed between propagation paths of the signal.

In operation 1005, the electronic device may determine refraction information for each of a plurality of cells of the FSS 230. The electronic device may determine refraction information for each cell of the plurality of cells of the FSS 230 based on the pattern information. That is, the refraction information may be determined based on a difference between the basic pattern and the reception pattern. The refraction information may be specific to the liquid crystal layer in the unit cell. In order to change electrical length of the signal and adjust a characteristic (e.g., phase, gain) of the reflected signal, a degree of refraction in the liquid crystal layer may be determined. The electronic device may determine refraction information for each unit cell to reduce an effect due to spatial constraints such as an obstacle.

According to an embodiment, the electronic device may determine refraction information based on the magnitude of the liquid crystal layer. For example, the electronic device may determine refraction information based on the region of the liquid crystal layer. This is because the change in permittivity compared to the change in applied voltage is different according to the area of the liquid crystal layer. For example, the electronic device may determine refraction information based on thickness of the liquid crystal layer. Depending on the thickness of the liquid crystal layer, the degree of attenuation may vary. The degree of attenuation affects the gain.

According to an embodiment, the electronic device may determine refraction information based on the magnitude of the FSS 230. For example, the electronic device may determine refraction information based on the number of unit cells of the FSS 230. According to the number of unit cells, the granularity for controlling the reflected signal may vary compared to the incident signal. The electronic device may control characteristics (e.g., phases, gains) of the reflected signal in more detail as the number of unit cells increases. According to an embodiment, the FSS 230 may independently control permittivity of a plurality of unit cells by applying individual voltages. Accordingly, the electronic device may determine refraction information using one-to-one mapping or multi-to-one mapping based on the number of unit cells of the FSS 230.

The electronic device may determine refraction information for each of the unit cells. In some other embodiments, the electronic device may determine refraction information based on the location of at least one unit cell corresponding to the blocking pattern 700. For example, the electronic device need not change the permittivity of each of the unit cells, but may specifically change the permittivity of at least one unit cell identified through the blocking pattern 700. In order to increase the efficiency of controlling the FSS 230, the electronic device may identify the at least one unit cell to change based on the blocking pattern 700. Thereafter, the electronic device may determine refraction information on the at least one unit cell.

In operation 1007, the electronic device may perform FSS reconfiguration.

The electronic device may determine voltage information for the FSS 230 based on refraction information for each of the unit cells of the FSS 230. For example, the electronic device may determine voltage information for the first unit cell based on refraction information for the first unit cell. The electronic device may determine voltage information for the second unit cell based on refraction information on the second unit cell. For example, the electronic device may determine voltage information for each of the unit cells of the FSS 230 based on the entire refraction pattern of the FSS 230.

The voltage information may be a voltage value to be applied to the unit cell. The influence of the obstacle may be reduced when receiving the signal, by inversely applying the blocking pattern related to the obstacle. In order to apply the refraction information, the electronic device may identify a voltage value for changing the permittivity of the liquid crystal layer. The electronic device may reset a voltage value for each of the unit cells of the FSS 230. The permittivity of the liquid crystal layer of the unit cell may be changed by the reset voltage of the unit cell. Not all of the unit cells of the FSS must be changed, and a voltage for at least a part of the unit cells of the FSS may be required to be changed. Not all of the unit cells of the FSS need be different from each other or need have a unique reset voltage. A signal incident on the FSS 230 may be reflected. Since the permittivity varies in at least a part of unit cells, the characteristics of the reflected signal may vary.

The electronic device may control phase and/or magnitude of the reflection signal of the FSS 230 through the voltage applied to the liquid crystal layer of the FSS 230. According to an embodiment, the electronic device may control the magnitude of the reflected signal based on voltage information for the liquid crystal layer of the FSS 230. According to an embodiment, the electronic device may control the phase of the reflected signal based on voltage information for the liquid crystal layer of the FSS 230. According to an embodiment, the electronic device may control the phase and magnitude of the reflection signal based on voltage information for the liquid crystal layer of the FSS 230.

In operation 1009, the electronic device may obtain a reconstruction signal based on the reconfigured FSS 230. Herein, the reconstruction signal is a signal in which a signal incident on the reconfigured FSS 230 is reflected. The electronic device may receive a damaged signal due to spatial constraints (e.g., obstacle 220, obstacle 901, and obstacle 951). The damaged signal may be input to the reconfigured FSS 230. The reconfigured FSS 230 may reflect the input signal. Based on the reconfigured FSS 230, the electronic device may obtain a signal (i.e., a reconstruction signal) that is restored closer to the signal of the signal source 210. As shown in the graph 920 of FIG. 9A or the graph 970 of FIG. 9B, the reconfigured FSS may provide a high gain in the direction of 0 degrees, even if an obstacle is disposed in the wireless communication environment.

In FIG. 2 to FIG. 10, operations at a receiving end at which an electronic device including an FSS receives a signal are described, but embodiments of the present disclosure are not limited thereto. An FSS for mapping refraction information according to embodiments may be disposed in the transmitting end. According to an embodiment, by receiving feedback on the obstacle, the transmission device may perform an FSS reconfiguration before transmitting a signal so that the obstacle is electrically transparent.

In embodiments, an electronic device may comprise a memory, a frequency selective surface (FSS) comprising a plurality of cells, and at least one processor. Each cell of the plurality of cells may comprise a liquid crystal layer. The at least one processor may be configured to receive a signal from another electronic device based on the FSS. The at least one processor may be configured to determine refraction information for each cell of the plurality of cells of the FSS based on a difference between first pattern information for the other electronic device and second pattern information for the received signal. The at least one processor may be configured to perform a reconfiguration for the FSS based on refraction information for each cell of the plurality of cells of the FSS. The at least one processor may be configured to obtain a reconstruction signal from the other electronic device based on the reconfigured FSS.

According to an embodiment, the at least one processor may be configured to, to determine the refraction information, identify the first pattern information for the other electronic device. The at least one processor may be configured to, to determine the refraction information, identify the second pattern information for the received signal. The at least one processor may be configured to, to determine the refraction information, identify blocking pattern information corresponding to the difference between the first pattern information and the second pattern information.

According to an embodiment, the first pattern information may comprise first signal gain values obtained for the other electronic device before receiving the signal. The second pattern information may comprise second signal gain values obtained by the signal being incident on a region of the FSS.

According to an embodiment, the at least one processor may be configured to determine the refraction information by determining a refractive index in each cell based on blocking pattern information corresponding to the difference between the first pattern information and the second pattern information. The refraction information may comprise the refractive index in each cell.

According to an embodiment, each cell of the plurality of cells may comprise a first metal layer, a second metal layer disposed on one surface of a printed circuit board (PCB), a third metal layer disposed on another surface of the PCB, and the liquid crystal layer disposed between the first metal layer and the second metal layer. A permittivity of the liquid crystal layer of each cell of the plurality of cells may be adjustably set by application of a voltage between the first metal layer and the third metal layer.

According to an embodiment, the at least one processor may be configured to perform the reconfiguration of the FSS by, for each cell of the plurality of cells of the FSS, determining a voltage based on the refraction information for the cell, and applying the determined voltage to the cell to thereby change a permittivity of the liquid crystal layer of the cell.

According to an embodiment, the plurality of cells may include a first cell associated with a first biasing line and a second cell associated with a second biasing line different from the first biasing line. The first biasing line may be configured to change a permittivity of the liquid crystal layer of the first cell by applying a first voltage to the first cell, and the second biasing line may be configured to change a permittivity of the liquid crystal layer of the second cell by applying a second voltage to the second cell.

According to an embodiment, the FSS may further comprise a ground plane. A gap between adjacent cells among the plurality of cells may be disposed in the ground plane.

According to an embodiment, each cell of the plurality of cells may comprise a plurality of dipole antennas having different lengths.

According to an embodiment, the FSS may be disposed in a reconfigurable intelligent surface (RIS).

In embodiments, a method performed by an electronic device may comprise receiving a signal from another electronic device based on a frequency selective surface (FSS) comprising a plurality of cells. Each cell of the plurality of cells may comprise a liquid crystal layer. The method may comprise determining refraction information for each cell of the plurality of cells of the FSS based on a difference between first pattern information for the other electronic device and second pattern information for the received signal. The method may comprise performing a reconfiguration for the FSS based on refraction information for each cell of the plurality of cells of the FSS. The method may comprise obtaining a reconstruction signal from the other electronic device based on the reconfigured FSS.

According to an embodiment, the determining of the refraction information may comprise identifying the first pattern information for the other electronic device. The determining of the refraction information may comprise identifying the second pattern information for the received signal. The determining of the refraction information may comprise identifying blocking pattern information corresponding to the difference between the first pattern information and the second pattern information.

According to an embodiment, the first pattern information may comprise first signal gain values obtained for the other electronic device before receiving the signal. The second pattern information may comprise second signal gain values obtained by the signal being incident on a region of the FSS.

According to an embodiment, the determining of the refraction information may comprise determining a refractive index in each cell based on blocking pattern information corresponding to the difference between the first pattern information and the second pattern information. The refraction information may comprise the refractive index in each cell.

According to an embodiment, each cell of the plurality of cells may comprise a first metal layer, a second metal layer disposed on one surface of a printed circuit board (PCB), a third metal layer disposed on another surface of the PCB, and the liquid crystal layer disposed between the first metal layer and the second metal layer. A permittivity of the liquid crystal layer of each cell of the plurality of cells may be adjustably set by application of a voltage between the first metal layer and the third metal layer.

According to an embodiment, the performing of the reconfiguration for the FSS may comprise, for each cell of the plurality of cells of the FSS, determining a voltage based on the refraction information for the cell, and applying the determined voltage to the cell to thereby change a permittivity of the liquid crystal layer of the cell.

According to an embodiment, the plurality of cells may include a first cell associated with a first biasing line and a second cell associated with a second biasing line different from the first biasing line. The first biasing line may be configured to change a permittivity of the liquid crystal layer of the first cell by applying a first voltage to the first cell, and the second biasing line may be configured to change a permittivity of the liquid crystal layer of the second cell by applying a second voltage to the second cell.

According to an embodiment, the FSS may further comprise a ground plane. A gap between adjacent cells among the plurality of cells may be disposed in the ground plane.

According to an embodiment, the plurality of cells may comprise a plurality of dipole antennas having different lengths.

According to an embodiment, the FSS may be disposed in a reconfigurable intelligent surface (RIS).

In embodiments, an electronic device includes at least one memory, at least one processor, and a frequency selective surface (FSS) including a plurality of cells. Each cell of the plurality of cells includes a liquid crystal layer. The FSS is configured to receive a signal from another electronic device and convert the signal for outputting to the at least one processor. The at least one processor is configured to receive an impeded signal of the other electronic device from the FSS, determine refraction information for each cell of the plurality of cells of the FSS based on a difference between first pattern information for the other electronic device and second pattern information for the impeded signal, perform a reconfiguration of the FSS based on the refraction information for each cell of the plurality of cells of the FSS, and receive a reconstructed signal of the other electronic device converted by the reconfigured FSS.

In embodiments, a method performed by an electronic device may include receiving an impeded signal of another electronic device from a frequency selective surface (FSS) comprising a plurality of cells, determining refraction information for each cell of the plurality of cells of the FSS based on a difference between first pattern information for the other electronic device and second pattern information for the impeded signal, performing a reconfiguration of the FSS based on the refraction information for each cell of the plurality of cells of the FSS, and receiving a reconstructed signal of the other electronic device converted by the reconfigured FSS. The FSS may be configured to receive a signal from another electronic device and convert the signal for outputting, and each cell of the plurality of cells of the FSS may include a liquid crystal layer.

According to an embodiment, the first pattern information may comprise first signal gain values obtained by an unimpeded signal of the other electronic device being incident on a region of the FSS, and the second pattern information may comprise second signal gain values obtained by the impeded signal being incident on the region of the FSS.

According to an embodiment, the first pattern information may comprise first signal gain values derived from a signal at the other electronic device, and the second pattern information may comprise second signal gain values obtained by the impeded signal being incident on a region of the FSS.

A reflective radio wave surface driven by the liquid crystal layer is easy to mass-produce based on the LCD manufacturing process. In addition, according to various embodiments of the present disclosure, the FSS 230 may be operated efficiently in connection with next-generation communication functions such as beam steering, polarization manipulation, and multi-beam through RIS programming.

According to various embodiments of the present disclosure, the FSS device 300 can solve problems caused by complex obstacles in conventional cloaking techniques or scattering removal, and effectively suppress the scattering effect of obstacles through impedance control of the FSS 230 at the receiving end, regardless of the shape of the obstacle.

The effects that can be obtained from the present disclosure are not limited to those described above, and any other effects not mentioned herein will be clearly understood by those having ordinary knowledge in the art to which the present disclosure belongs, from the following description.

Methods according to embodiments described in the present disclosure may be implemented in the form of hardware, software, or a combination of hardware and software.

When implemented as software, a computer-readable storage medium storing one or more program (software module) may be provided. The one or more program stored in the computer-readable storage medium is configured for execution by one or more processor in the electronic device. The one or more program include instructions that cause the electronic device to execute methods according to embodiments described in the present disclosure.

Such program (software modules, software) may be stored in random access memory, non-volatile memory including flash memory, read only memory (ROM), electrically erasable programmable read only memory (EEPROM), magnetic disc storage device, compact disc-ROM (CD-ROM), digital versatile disc (DVD) or other form of optical storage, magnetic cassette. Alternatively, it may be stored in a memory configured with some or all combinations thereof. Each configuration memory may be included a plurality.

The program may be stored in an attachable storage device that may be accessed through a communication network, such as the Internet, Intranet, local area network (LAN), wide area network (WAN), or storage area network (SAN), or a combination thereof. Such a storage device may be connected to a device performing an embodiment of the present disclosure through an external port. A separate storage device on the communication network may access a device performing an embodiment of the present disclosure.

In the above-described specific embodiments of the present disclosure, the component included in the disclosure is expressed in singular or plural according to the presented specific embodiment. However, singular or plural expression is chosen appropriately for the situation presented for convenience of explanation, and the present disclosure is not limited to singular or plural component, and even if the component is expressed in plural, it may be configured with singular, or even if it is expressed in singular, it may be configured with plural.

In the detailed description of the present disclosure, various specific embodiments have been described, but it will be understood that various modifications are possible without departing from the scope of the present disclosure.

What is claimed is:

1. An electronic device comprising:

a memory;

a frequency selective surface (FSS) comprising a plurality of cells, each cell of the plurality of cells comprising a liquid crystal layer; and at least one processor operatively connected with the memory, wherein the at least one processor is configured to:

receive a signal, from external electronic device, by the FSS;

determine refraction information of the plurality of cells of the FSS based on a difference between:

first pattern information including first signal gains of the FSS obtained from the external electronic device before receiving the signal, and second pattern information including second signal gains of the FSS obtained by the received signal;

perform a reconfiguration for the FSS based on the refraction information of the plurality of cells of the FSS; and obtain a reconstruction signal from the external electronic device, by the reconfigured FSS.

2. The electronic device of claim 1, wherein the at least one processor is, to determine the refraction information, configured to:

identify the first pattern information for the external electronic device;

identify the second pattern information for the received signal; and identify blocking pattern information corresponding to the difference between the first pattern information and the second pattern information.

3. The electronic device of claim 1, wherein the at least one processor is configured to determine the refraction information by determining a refractive index of each cell based on blocking pattern information corresponding to the difference between the first pattern information and the second pattern information, and wherein the refraction information comprises the refractive index of each cell.

4. The electronic device of claim 1, wherein each cell of the plurality of cells comprises a first metal layer, a second metal layer disposed on one surface of a printed circuit board (PCB), a third metal layer disposed on another surface of the PCB, and the liquid crystal layer disposed between the first metal layer and the second metal layer, and wherein a permittivity of the liquid crystal layer of each cell of the plurality of cells is adjustable by applying a voltage between the first metal layer and the third metal layer.

5. The electronic device of claim 1, wherein the at least one processor is configured to perform the reconfiguration of the FSS by, of the plurality of cells of the FSS:

determining a voltage for a cell based on the refraction information; and change a permittivity of the liquid crystal layer of the cell by applying the determined voltage to the cell.

6. The electronic device of claim 1, wherein the plurality of cells includes a first cell associated with a first biasing line and a second cell associated with a second biasing line different from the first biasing line, wherein a first permittivity of the liquid crystal layer of the first cell is changed by applying a first voltage, via the first biasing line, to the first cell, and wherein a second permittivity of the liquid crystal layer of the second cell is changed by applying a second voltage, via the second biasing line, to the second cell.

7. The electronic device of claim 1, wherein the FSS further comprises a ground plane, and wherein a gap between adjacent cells among the plurality of cells is disposed inon the ground plane.

8. The electronic device of claim 1, wherein each cell of the plurality of cells comprises a plurality of dipole antennas having different lengths respectively.

9. The electronic device of claim 1, wherein the FSS is disposed on a reconfigurable intelligent surface (RIS).

10. A method performed by an electronic device, the method comprising:

receiving a signal from an external electronic device based on a frequency selective surface (FSS) comprising a plurality of cells, each cell of the plurality of cells comprising a liquid crystal layer;

determining refraction information of the plurality of cells of the FSS based on a difference between:

first pattern information including first signal gains of the FSS obtained from the external electronic device before receiving the signal, and second pattern information including second signal gains of the FSS obtained by the received signal;

performing a reconfiguration for the FSS based on the refraction information of the plurality of cells of the FSS; and obtaining a reconstruction signal from the external electronic device, by the reconfigured FSS.

11. The method of claim 10, wherein the determining of the refraction information, comprises:

identifying the first pattern information for the external electronic device;

identifying the second pattern information for the received signal; and identifying blocking pattern information corresponding to the difference between the first pattern information and the second pattern information.

12. The method of claim 10, wherein the determining of the refraction information comprises:

determining a refractive index of each cell based on blocking pattern information corresponding to the difference between the first pattern information and the second pattern information, and wherein the refraction information comprises the refractive index of each cell.

13. The method of claim 10, wherein each cell of the plurality of cells comprises a first metal layer, a second metal layer disposed on one surface of a printed circuit board (PCB), a third metal layer disposed on another surface of the PCB, and the liquid crystal layer disposed between the first metal layer and the second metal layer, and wherein a permittivity of the liquid crystal layer of each cell of the plurality of cells is adjustable by applying a voltage between the first metal layer and the third metal layer.

14. The method of claim 10, wherein the performing of the reconfiguration of the FSS comprises, of the plurality of cells of the FSS:

determining a voltage based on the refraction information for the cell; and changing a permittivity of the liquid crystal layer of the cell by applying the determined voltage to the cell.

15. The method of claim 10, wherein the plurality of cells includes a first cell associated with a first biasing line and a second cell associated with a second biasing line different from the first biasing line, wherein a first permittivity of the liquid crystal layer of the first cell is changed by applying a first voltage, via the first biasing line, to the first cell, and wherein a second permittivity of the liquid crystal layer of the second cell is changed by applying a second voltage, via the second biasing line, to the second cell.

16. The method of claim 10, wherein the FSS further comprises a ground plane, and wherein a gap between adjacent cells among the plurality of cells is disposed on the ground plane.

17. The method of claim 10, wherein each cell of the plurality of cells comprises a plurality of dipole antennas having different lengths, respectively.

18. The method of claim 10, wherein the FSS is disposed on a reconfigurable intelligent surface (RIS).

* * * * *